US010988708B2

(12) United States Patent
Blanchard et al.

(10) Patent No.: US 10,988,708 B2
(45) Date of Patent: Apr. 27, 2021

(54) SYSTEMS AND METHODS FOR FATTY ACID ALKYL ESTER PRODUCTION WITH RECYCLING

(71) Applicant: Inventure Renewables, Inc., Tuscaloosa, AL (US)

(72) Inventors: Cory O'Neil Blanchard, Birmingham, AL (US); Ryan Alexander Long, Northport, AL (US); Hayden Sawyer, Augusta, GA (US)

(73) Assignee: Inventure Renewables, Inc., Tuscaloosa, AL (US)

( * ) Notice: Subject to any disclaimer, the term of this patent is extended or adjusted under 35 U.S.C. 154(b) by 0 days.

(21) Appl. No.: 16/814,675

(22) Filed: Mar. 10, 2020

(65) Prior Publication Data

US 2020/0270545 A1 Aug. 27, 2020

Related U.S. Application Data

(63) Continuation of application No. PCT/US2020/019706, filed on Feb. 25, 2020.

(Continued)

(51) Int. Cl.
*C11C 3/00* (2006.01)
*B01D 3/06* (2006.01)
*B01J 3/00* (2006.01)

(52) U.S. Cl.
CPC ................ *C11C 3/003* (2013.01); *B01D 3/06* (2013.01); *B01J 3/008* (2013.01)

(58) Field of Classification Search
CPC ........... C11C 3/003; B01D 3/06; B01D 3/008; B01D 3/009; B01J 3/008

(Continued)

(56) References Cited

U.S. PATENT DOCUMENTS 2,494,366 A 1/1950 Sprules et al.
6,187,939 B1 2/2001 Sasaki et al.

(Continued)

FOREIGN PATENT DOCUMENTS

EP 0985654 A1 3/2000
EP 1061120 A1 12/2000

(Continued)

OTHER PUBLICATIONS

Copenhaver, Written Opinion and International Search Report for PCT/US2015/066932, dated Feb. 25, 2016.

(Continued)

*Primary Examiner* — Deborah D Carr
(74) *Attorney, Agent, or Firm* — Greer Burns & Crain, Ltd.; Gregory P. Einhorn

(57) ABSTRACT

Provided are industrial processes for producing a fatty acid alkyl ester from a natural oil feedstock or a mixed lipid feedstock, wherein the natural oil feedstock comprises a free (un-esterified) organic acid such as a free fatty acid, comprising: producing fatty acid alkyl esters using an alcoholysis reaction such as a vapor phase alcoholysis reaction or a supercritical alcoholysis reaction, wherein the alcoholysis reaction takes place under conditions comprising: mixing the natural oil feedstock and/or mixed lipid feedstock and alcohol into an alcoholysis reactor or equivalent, and then depressurizing, and then recovering the fatty acid alkyl esters from the alcoholysis reactor or equivalent by distillation in a distillation column, leaving a still pitch or distillation bottoms in the distillation column or equivalent, wherein the fatty acid alkyl esters can be removed from the alcoholysis reactor or equivalent with or without cooling of the reaction mixture prior to depressurization.

36 Claims, 2 Drawing Sheets

Related U.S. Application Data

(60) Provisional application No. 62/810,283, filed on Feb. 25, 2019.

(58) Field of Classification Search
USPC ........................................................ 554/167
See application file for complete search history.

(56) References Cited

U.S. PATENT DOCUMENTS

| | | | |
|---|---|---|---|
| 7,227,030 B2 | 6/2007 | Saka | |
| 8,288,573 B2 | 10/2012 | Wang et al. | |
| 8,530,684 B2 | 9/2013 | Cho et al. | |
| 9,909,077 B2 | 3/2018 | Slade et al. | |
| 9,938,487 B2 | 4/2018 | Kim et al. | |
| 10,183,268 B1 | 1/2019 | McSpadden et al. | |
| 2005/0075509 A1 | 4/2005 | Luxem et al. | |
| 2007/0277432 A1 | 12/2007 | Jackam et al. | |
| 2008/0312468 A1 | 12/2008 | Fleisher | |
| 2009/0105492 A1 | 4/2009 | Nomura et al. | |
| 2011/0105775 A1 | 5/2011 | Nang et al. | |
| 2016/0194581 A1* | 7/2016 | Phillips | C11C 3/003 554/167 |
| 2016/0207879 A1 | 7/2016 | Berry et al. | |

FOREIGN PATENT DOCUMENTS

| | | |
|---|---|---|
| WO | 2007058485 A1 | 5/2007 |
| WO | 2017018695 A1 | 2/2017 |

OTHER PUBLICATIONS

Saka et al., "Non-catalytic biodiesel fuel production with supercritical methanol technologies", Journal of Scientific and Industrial Research, v 65, May 2006, p. 420-425.

* cited by examiner

SYSTEMS AND METHODS FOR FATTY ACID ALKYL ESTER PRODUCTION WITH RECYCLING

RELATED APPLICATIONS

This U.S. Utility Patent Application is a continuation of PCT International Application PCT/US2020/019706, filed Feb. 25, 2020, which claims the benefit of priority under 35 U.S.C. § 119(e) of U.S. Provisional Application Serial No. (USSN) 62/810,283, filed Feb. 25, 2019. The aforementioned applications are expressly incorporated herein by reference in their entirety and for all purposes.

TECHNICAL FIELD

This invention generally relates to the economically efficient preparation of high-quality fatty acid esters and co-product glycerol from oils, e.g., natural oils. In alternative embodiments, the oils comprise a high percentage (e.g. greater than about 10%) of organic acids, e.g. free fatty acids. In alternative embodiments, provided are methods and industrial processes for producing a fatty acid alkyl ester from a natural oil feedstock or a mixed lipid feedstock. In alternative embodiments, the methods or industrial processes comprise recycling of unreacted glycerides and saponifiables such as waxes, phospholipids, sphingolipids, sterol esters and the like, after the distillation of fatty alkyl esters back to alcoholysis reactor to increase yield.

BACKGROUND

Biodiesel is a renewable fuel that can be blended with, or replace, conventional diesel fuel for combustion in diesel engines. Current commercial methods for the production of biodiesel involve subjecting natural oils (e.g. soybean oil or palm oil) to a transesterification process in which triglycerides within the natural oil feedstock are reacted with alcohol in the presence of a basic catalyst, e.g. sodium hydroxide or sodium methoxide, or a two-stage process wherein the oil is subjected to a first acid-catalyzed esterification reaction and then a second base-catalyzed transesterification reaction. The composition of the biodiesel product depends on the alcohol used in the transesterification reaction. For example, if methanol is the selected alcohol, the resultant biodiesel will be comprised of fatty acid methyl esters (FAME). If ethanol is the selected alcohol, the resultant biodiesel product will be comprised of fatty acid ethyl esters (FAEE).

In addition to biodiesel, the resulting product from the catalyzed transesterification of natural oils also contains glycerol (i.e. glycerin) and unreacted alcohol. The glycerol product is typically contaminated and unsuitable for use as high-value "food-grade" glycerol.

In order to obtain fuel-grade biodiesel product, e.g. a biodiesel meeting the specifications set forth in the American Society of Testing and Manufacturing (ASTM) Specification D6751, the transesterification product mixture must undergo further processing in order to separate the fatty acid alkyl esters from the reaction by-products such as glycerol, unreacted alcohol, water, free fatty acids, salts, and light and heavy organics. Conventional separation techniques, most typically liquid-liquid-type batch separation techniques, are time consuming, maintenance intensive, and economically inefficient.

Conventional biodiesel production techniques are also limited in their ability to process oils with high free fatty acid content, e.g. oils with free fatty acid contents of 10% or greater. This is primarily due to the tendency of free fatty acids to react with the catalyst, increasing catalyst replacement costs and lowering overall biodiesel yields. Such shortcomings limit the growth of the biodiesel market.

There still remains a need for an economical biodiesel process that can survive without government subsidy, as well as improve upon existing processes that are less environmentally friendly. Many traditional processes that utilize only base catalysis and refined feedstocks that cannot operate profitably without the RFS credit. Other processes—acid/base and enzymatic—while an improvement over the base catalyzed route due to their ability to convert high acid feedstocks, still come with their own problems associated with catalyst usage/recycle & waste disposal. And, while many have pursued the supercritical alcohol route, none have developed a process successful enough for wide commercial deployment. Thus, a heretofore unaddressed need exists in the industry to provide a commercial solution that improves upon all the shortcomings of existing technology.

SUMMARY

In alternative embodiments, provided herein are methods for economically and effectively preparing fatty acid alkyl ester by using a mixed lipid feedstock as a starting material. In alternative embodiments, provided are methods comprising distillation of fatty acid alkyl esters, e.g., FAME, from unreacted saponifiable and/or inert unsaponifiable matter. In alternative embodiments, the methods or industrial processes comprise recycling of unreacted glycerides and/or saponifiable compounds after the distillation of fatty alkyl esters back to an alcoholysis reactor to increase yield. In alternative embodiments, methods as provided herein improve on both the efficiency, yield and feedstock versatility of known methods.

In alternative embodiments, provided are methods for preparing fatty acid alkyl ester suitable for biodiesel fuel by using a raw material containing (i.e., feedstock comprising) a fatty acid and a fat, wherein the fat can comprise vegetable or animal fats, and oils, waste oils thereof, or a byproduct generated during a refining or treating process of vegetable or animal fats and oils, grease, natural waxes and so on.

In alternative embodiments, provided are catalyst-free methods for preparing fatty acid alkyl esters by using fats which do not require neutralization, filtration, or any other cleaning process for removing a catalyst.

In alternative embodiments, provided are methods for producing fatty acid alkyl esters, comprising the steps of: carrying out an alcoholysis (optionally, in an alcoholysis reactor) of the feedstock (comprising fatty acids and fats) at the temperature of between about 150° C. to 350° C. and the pressure of between about 1 to 350 bar; carrying out a phase separation of the alcohol and/or glycerin from the alkyl esters; carrying out a separation of a majority (substantially most, or about 90%, 95% or 99% or more) of the alkyl esters from non-alkyl ester components, which can comprise saponifiable materials such as phospholipids, glycolipids, waxes); and optionally, further comprising recycling of a majority (substantially most, or about 90%, 95% or 99% or more) of the non-alkyl ester components, for example, recycling back to an alcoholysis reactor (or the same alcoholysis reactor).

Accordingly, in alternative embodiments, methods provided herein for preparing fatty acid alkyl esters can be economically and effectively prepared with a raw material (or a feedstock) containing (or comprising) a fat component such as vegetable or animal fats and oils, or waste oils thereof, and/or a byproduct generated during a refining or treating process of a vegetable or an animal fat and oils, grease, natural waxes and so on, and also can comprise saponifiable materials such as phospholipids, glycolipids, waxes.

In addition, in alternative embodiments, methods as provided herein do not use catalysts and/or do not require additional processes for removing a catalyst such as neutralization, filtration or any other cleaning process.

In alternative embodiments, methods as provided herein excel in converting mixed lipid feedstock containing high free acidity (optionally, as fatty acids), but they are not limited to use of high free acidity feedstocks.

In alternative embodiments, provided are methods and industrial processes for producing a biodiesel or a fat-based diesel fuel, and optionally a glycerol co-product, from a natural oil feedstock or a mixed lipid feedstock (which can optionally comprise high free acidity), wherein the natural oil feedstock comprises about 0.5%, 1%, 2%, 3%, 4%, 5%, 6%, 7%, 8%, 9%, or 10% or more, or between about 1% and 10%, or between about 0% and 20% or more, or between about 5% and 10%, free (un-esterified) organic acid by weight of the feedstock, wherein optionally the organic acid comprises a free fatty acid, and optionally the natural oil or the mixed lipid feedstock comprises a corn oil, a distillers corn oil, a linseed oil, a flaxseed oil, a cottonseed oil, a rapeseed (canola) oil, a peanut oil, a sunflower oil, a safflower oil, a coconut oil, a palm oil, dende oil, an oil from a plant of the genus *Elaeis* or *Attalea*, a soybean oil, a fatty acid distillate, an acid oil, an algal oil, a microbial oil, a crude edible oil, or any combination thereof, and optionally producing a biodiesel or a fat-based diesel fuel meeting or exceeding the specifications of ASTM Standard D6751-14 for B100 biodiesel, and optionally producing a USP grade glycerol and/or splitter crude glycerol, the method or industrial process comprising:

a. feeding the natural oil feedstock or mixed lipid feedstock into an alcoholysis reactor or equivalent; and b. feeding an at least one alcohol (or solvent) and, optionally, a co-solvent, and, optionally, a catalyst, into the alcoholysis reactor, wherein the at least one alcohol and, optionally, co-solvent, is/are concurrently or counter-currently contacted with the lipid feedstock, wherein the at least one alcohol comprises one alcohol, two alcohols, or a plurality of different alcohols, and the molar ratio of alcohol-to-feedstock in the mixture is between about 1:1, 2:1 or 3:1 to about 50:1, 60:1 or 70:1, or about 40:1, and the mass ratio of the optional co-solvent-to-feedstock in the mixture is between about 0.001:1 or 0.01:1 to about 5:1 or 0.12:1, and the amount of the optional catalyst, if present, is between about 1 ppm or 10 ppm to about 10,000 ppm (by weight) with respect to the mixed lipid feedstock, c. reacting the mixture at a temperature of between about 150° C. to 350° C. and pressure of between about 1 to 350 bar, wherein optionally, water and/or at least one alcohol is/are added and/or removed during the formation of fatty acid ester, thereby producing the crude fatty acid alkyl esters with an acid value less than 10, 11 or 12, d. separating the crude fatty acid ester from the at least one alcohol, either inside or outside the alcoholysis reactor, e. removing glycerin and/or water and/or the at least one alcohol and/or the catalyst (or removing substantially most of the glycerin, water and at least one alcohol, wherein optionally removing substantially most means removing over about 80%, 85%, 90%, 95%, 98%, 99% or more) from the crude fatty acid ester, and optionally the at least one alcohol is removed and/or recovered, or substantially removed and/or recovered (or about 90%, 95%, 98%, 99%, 99.5% or more or the at least one alcohol is removed and/or recovered); and f. purifying the fatty acid ester, e.g., using distillation or equivalents or other purification methods or devices, with mandatory recycling (or purging) of at least a portion of (or, substantially most of) the saponifiable and/or unsaponifiable content back to the alcoholysis reactor so as to increase the overall yield of fatty acid ester from saponifiable content (wherein optionally at least a portion of means at least about 0.001%, 0.01%, 0.1%, 1.0%, 2%, 5%, 10%, 15%, 20%, 25% or 30%, or more, and wherein optionally substantially most means at least about 50.001%, 55%, 60%, 65%, 70%, 75%, 80%, 85%, 90%, 95%, 98%, 99% or more, of the saponifiable and/or unsaponifiable content is recycled back to the alcoholysis reactor), wherein optionally, the saponifiable and/or unsaponifiable content is recycled or purged back to the alcoholysis reactor, and optionally, the saponifiable and/or unsaponifiable content that is purged from the system is subjected to further downstream reaction and/or separation so as to valorize (or recycle) the components of that stream, and optionally less than about 60%, 50%, 40%, 30%, 20%, 10%, 5% or 2.5% of the saponifiable and/or unsaponifiable content is subjected to further downstream separation.

In alternative embodiments, the at least one alcohol used in a reaction or a process as provided herein contains one, two or multiple alcohols that are between 1 and 5 carbons, or have 1, 2, 3, 4, 5 or 6 or more carbons, e.g. methanol, ethanol, propanol, butanol, isobutanol, isopropyl alcohol or a combination thereof. In various other embodiments, conditions may be such that a higher alcohol containing more than 5, 6, 7, 8 or more carbons are used.

In alternative embodiments, the methods and industrial processes further comprise an additional step for separating crude fatty acid ester from (unreacted) alcohol inside the alcoholysis reactor by using a concept similar to fat splitting. For example, in an exemplary embodiment, where water is normally the countercurrent reactant in fat splitters for fatty acid production, this embodiment uses alcohol countercurrently esterify/transesterify the incoming mixed lipid feedstock to form fatty acid esters, water, and optionally also glycerin if mixed lipid feedstock contains any glycerides.

In alternative embodiments, the methods and industrial processes as provided herein further comprise a step comprising fat splitting of the mixed lipid feedstock to produce a high acid value fatty stream, which also co-produces glycerin prior to entering the alcoholysis reactor. This will enable higher yield of fatty acid ester in the alcoholysis reactor, as well as ensure that glycerin is not degraded in the high temperature environment.

In alternative embodiments, partial glycerolysis is conducted on the flashed post-reaction material (after a majority of alcohol (e.g., after about 75%, 80, 85%, 90%, 95%, 98%, 99% or more alcohol) has been removed from the reaction mixture), the washed and decanted crude fatty alkyl ester stream, the dried crude fatty alkyl ester stream, or any combination thereof. In alternative embodiments, the flashed post-reaction mixture comprises up to about 5 weight percent (wt %) fatty acid (AV 10-12), which must be reduced (e.g., decreased about 10%, 20%, 30% or 40% or more) at some point prior to recovery of a majority of fatty alkyl esters from the crude ester phase. If distillation is the separation method utilized for recovery of fatty alkyl esters, then the AV must be reduced to a manageable level (e.g., to about 5 wt %, 4 wt %, 3 wt %, 2 wt % or 1 wt %) so that the fatty alkyl ester distillate product can optionally meet the B100 specification.

In alternative embodiments, partial alcoholysis is conducted on the flashed post-reaction material (after a majority of alcohol (e.g., after about 75%, 80, 85%, 90%, 95%, 98%, 99% or more alcohol) has been removed from the reaction mixture), the washed/decanted crude fatty alkyl ester stream, the dried crude fatty alkyl ester stream, or any combination thereof. In alternative embodiments, partial alcoholysis is conducted in the about 3 to 20 barg range, with injection and removal of alcohol, optionally continuous injection and removal of alcohol, so as to remove water as it is formed from the esterification of residual fatty acids. The flashed post-reaction mixture may contain up to about 5 wt % fatty acid (AV 10-12), which optionally is reduced (e.g., decreased about 10%, 20%, 30% or 40% or more) at any point prior to recovery of a majority of fatty alkyl esters from the crude ester phase. If distillation is the separation method utilized for recovery of fatty alkyl esters, then the AV must be reduced to less than about 2 if it is desired that the fatty alkyl ester distillate product should meet the B100 specification without any further downstream treatment.

In alternative embodiments, the first residual lipid phase that is recycled comprises up to about 30%, 40%, 50%, 55% or 60% or more, or between about 20% and 70%, unsaponifiable content. In alternative embodiments, the system is operated to combine unsaponifiable content, which can be useful for simplifying downstream recovery of valuable components contained in this stream, such as sterols.

In alternative embodiments, the first fatty acid alkyl ester produced contains an acid value in excess of the B100 specification for biodiesel and must undergo a neutralization step, e.g., either by chemical or adsorptive means, that reduces the acid value to meet the B100 specification. In alternative embodiments, the acid value of the first fatty acid alkyl ester produced contains an acid value up to about 2 and must undergo a neutralization step, e.g., either by chemical or adsorptive means, that reduces the acid value to less than about 0.5, or less than 0.3.

In alternative embodiments, the first residual lipid phase that is recycled for additional alcoholysis is blended with the natural oil or mixed lipid feedstock (fresh feed) in a ratio of 1 part fresh feed/0.01 part recycled residual lipid phase to 1 part fresh feed/1 part recycled residual lipid phase.

In alternative embodiments, a first fatty acid alkyl ester is produced by subjecting the dried crude fatty acid alkyl ester to a distillation. In alternative embodiments, a first fatty acid alkyl ester is produced by subjecting the dried crude fatty acid alkyl ester to a chromatography.

In alternative embodiments, provided are methods or industrial processes for producing a fatty acid alkyl ester from a natural oil feedstock or a mixed lipid feedstock, wherein the natural oil feedstock comprises 0% of the weight of the feedstock, or about 0.2%, 0.5%, 1%, 2%, 3%, 4%, 5%, 6%, 7%, 8%, 9%, or 10%, or between about 1% and 10%, or between about 0.5% and 20%, or between about 5% and 30% or more, free (un-esterified) organic acid by weight of the feedstock, wherein optionally the organic acid comprises a free fatty acid, and optionally the natural oil and/or the mixed lipid feedstock comprises a corn oil, a distillers corn oil, a linseed oil, a flaxseed oil, a cottonseed oil, a rapeseed (canola) oil, a peanut oil, a sunflower oil, a safflower oil, a coconut oil, a palm oil, dende oil, an oil from a plant of the genus *Elaeis* or *Attalea*, a soybean oil, a fatty acid distillate, an acid oil, an algal oil, a microbial oil, a crude edible oil, or any combination thereof, and optionally producing a biodiesel or a fat-based diesel fuel meeting or exceeding the specifications of ASTM Standard D6751-14 for B100 biodiesel, and optionally producing a USP grade and/or a splitter crude glycerol, the method or industrial process comprising:

(a) producing fatty acid alkyl esters using an alcoholysis reaction (and optionally the alcoholysis reaction comprises a vapor phase reaction and/or a supercritical reaction and/or a liquid phase reaction), wherein the alcoholysis reaction takes place under conditions comprising: (i) feeding or adding the natural oil feedstock and/or mixed lipid feedstock into an alcoholysis reactor or equivalent; (ii) optionally feeding at least one alcohol (or solvent) and, optionally, a co-solvent, and, optionally, a catalyst, into the alcoholysis reactor or equivalent; thus making a reaction mixture comprising the natural oil feedstock and/or mixed lipid feedstock and optionally alcohol, and optionally, a co-solvent, and optionally, a catalyst, wherein the at least one alcohol (if present) and, optionally, co-solvent, is/are concurrently or counter-currently contacted with the lipid feedstock, and the molar ratio of alcohol-to-feedstock in the reaction mixture is between about 1:1, 2:1 or 3:1 to about 300:1, or about 200:1, or about 100:1, or about 70:1, or about 50:1, or about 40:1, and the mass ratio of the optional co-solvent-to-feedstock in the reaction mixture is between about 0.001:1 or 0.01:1 to about 5:1 or about 0.12:1, and the amount of the optional catalyst, if present, is between about 1 ppm to 10 ppm to about 10,000 ppm to 20,000 ppm (by weight) with respect to the mixed lipid feedstock, and (iii) reacting the reaction mixture at a temperature of between about 150° C. to 350° C. and pressure of between about 1 to 350 bar, wherein optionally, water and/or the at least one alcohol and/or catalyst is/are added and/or removed during the formation of fatty acid alkyl ester, thereby producing the fatty acid alkyl esters; and (b) depressurizing, and then recovering the fatty acid alkyl esters from the alcoholysis reactor or equivalent by distillation in a distillation column or equivalent, leaving a still pitch or distillation bottoms in the distillation column or equivalent, wherein the fatty acid alkyl esters are removed from the alcoholysis reactor or equivalent with or without cooling of the reaction mixture prior to depressurization, wherein optionally, after at least one alcohol (if present), water and/or glycerin have been removed from the reaction mixture, the fatty acid alkyl esters are purified, optionally purified by a distillation or an equivalent process, thereby generating a product mixture comprising the fatty acid alkyl ester, unreacted alcohol, optionally glycerol (glycerin), and water, wherein optionally the method or industrial process further comprises recycling or purging the still pitch or distillation bottoms in the distillation column or equivalent, and optionally the recycling or purging the still pitch or distillation bottoms in the distillation column or equivalent comprises recycling the still pitch or distillation bottoms back to (or into) the reaction mixture in the alcoholysis reactor or to (or into) another alcoholysis reactor reaction mixture, wherein optionally the still pitch or distillation bottoms that are recycled or purged from the system are subjected to further downstream separation so as to valorize (or recycle) the components of that stream, and optionally less than about 50%, 40%, 30%, 20%, 15%, 10% or 5% of the still pitch or distillation bottom is subjected to further downstream separation, and optionally the method or industrial process further comprises a thermal hydrolysis, or "fat splitting", of the natural oil or the mixed lipid feedstock before step (a) (above), and optionally the separating the fatty acid alkyl ester from the alcohol, optionally separating the fatty acid alkyl ester from the alcohol either inside or outside the alcoholysis reactor, and optionally removing or recovering all of the glycerin, water and alcohol, or removing substantially most or all of the glycerin, water and/or alcohol (wherein optionally removing substantially most or all means removing or recovering over about 70%, 75%, 80% 90%, 95%, 98%, 99% or 99.5% or more of the glycerin, water and/or alcohol) from the reaction product, leaving the fatty acid alkyl ester, and optionally an alcohol (optionally the removed or recovered.

In alternative embodiments, the at least alcohol used in a reaction or a process as provided herein contains one or multiple alcohols that are between 1 and 5 carbons, or 1, 2, 3, 4, 5, 6, 7 or 8 or more carbons, e.g. methanol, ethanol, propanol, butanol, isobutanol, isopropyl alcohol or a combination thereof. In various other embodiments, conditions may be such that a higher alcohol containing more than 5, 6, 7 or 8 or more carbons are used.

In alternative embodiments, the methods or industrial processes as provided herein further comprise subjecting the product mixture of step (a) to a flash separation step, wherein the pressure of the product mixture is reduced, and optionally reduced to about atmospheric pressure, and the decrease in pressure results in an environment in which the vapor pressure of the unreacted alcohol exceeds its external pressure, thereby generating a flashed product mixture wherein between about 50% and 99%, or approximately 90%, 91%, 92%, 93%, 94% or 95% or more, of the unreacted alcohol and water in the product mixture are separated from the product mixture.

In alternative embodiments, the methods or industrial processes as provided herein further comprise subjecting the product mixture of step (a) to heat recovery via transferring of heat to one or multiple other streams in the process.

In alternative embodiments, the methods or industrial processes as provided herein further comprise an additional step comprising mixing the flashed product mixture with water and separating to form an aqueous stream comprising a glycerol, and a biodiesel stream comprising fatty acid alkyl esters.

In alternative embodiments, the methods or industrial processes as provided herein further comprise an additional step comprising stripping the glycerol from the aqueous stream, optionally in a stripping column or equivalent, thereby producing a glycerol product that is splitter crude grade (or approximately 80% glycerol) or USP-grade, or substantially pure, e.g., at least about 95%, 98% or 99% or more glycerol.

In alternative embodiments, the methods or industrial processes as provided herein further comprise an additional step comprising stripping the glycerol from the aqueous stream, optionally in a stripping column or equivalent, thereby producing a glycerol product that is splitter crude grade (which can be about 50%, 60%, 70% or 80% or more glycerol) or USP-grade, or substantially pure, i.e., at least about 95%, 96%, 97%, 98% or 99% or more percent glycerol.

In alternative embodiments, the methods or industrial processes as provided herein further comprise step comprising subjecting the biodiesel stream to a flash separation step wherein substantially all of the water (e.g., about 90%, 95%, 98%, 99% or 99.5% or more or the water is removed) in the biodiesel stream is removed, thereby producing a biodiesel stream, the biodiesel stream optionally meeting or exceeding the specification of ASTM Standard D6751-14 for B100 biodiesel.

In alternative embodiments, or the methods or industrial processes as provided herein, the still pitch or distillation bottoms comprise fatty acid alkyl esters, unreacted Free Fatty Acids (FFAs), any unreacted esters e.g. mono- di- and triglycerides, phospholipids, and any other unsaponifiable material in the feedstock, optionally sterols, vitamin E compounds (tocopherols and/or tocotrienols), squalene, or other compounds.

In alternative embodiments, the methods or industrial processes as provided herein further comprise subjecting the distillation bottoms to downstream separation to valorize (or recycle) the components into higher value components or fractions. Examples of downstream separation methods or industrial processes used on the distillation bottoms include, but are not limited to: short path distillation, molecular distillation, crystallization, saponification/acidulation, liquid/liquid extraction, and the like, and examples of higher value fractions or components include, but are not limited to: oryzanol, sterols, sterol esters, tocopherols, squalene, terpene, and the like.

In alternative embodiments, the methods or industrial processes as provided herein further comprise processing the second product mixture to separate the fatty acid alkyl esters from the remaining components of the product mixture using, optionally distilling or separating to generate an alkyl ester product that is suitable for use as an ASTM B100 biodiesel.

In alternative embodiments, the methods or industrial processes as provided herein further comprise flashing off unreacted alcohol, and optionally recovering and recycling the alcohol.

In alternative embodiments, provided are methods or industrial processes for producing a fatty acid alkyl ester from a natural oil feedstock and/or a mixed lipid feedstock, wherein the natural oil feedstock and/or mixed lipid feedstock comprises 0% to 100%, or about 5% to 95%, (un-esterified) organic acid by weight of the feedstock, wherein optionally the organic acid comprises a free fatty acid, and optionally the natural oil and/or the mixed lipid feedstock comprises an acid oil, a fatty acid, a fatty acid distillate, a wax, a tank bottoms, a distillers corn oil, an algal oil, a fish oil, a coconut oil, a palm kernel oil, a yellow grease, a brown grease, a tallow, a linseed oil, a flaxseed oil, a cottonseed oil, a rapeseed (canola) oil, a peanut oil, a sunflower oil, a safflower oil, a palm oil, dende oil, an oil from a plant of the genus *Elaeis* or *Attalea*, a soybean oil, a microbial oil, an insect oil, or any combination thereof, and optionally producing a biodiesel or a fat-based diesel fuel meeting or exceeding the specifications of ASTM Standard D6751-14 for B100 biodiesel, and optionally producing a USP grade glycerol and/or a splitter crude grade glycerol, the method or industrial process comprising:

(a) producing fatty acid alkyl esters using an alcoholysis reaction (wherein optionally the alcoholysis reaction comprises a vapor phase reaction and/or a supercritical alcoholysis reaction and/or a liquid phase reaction), wherein the alcoholysis reaction takes place under conditions comprising:

(i) feeding or adding the natural oil feedstock and/or mixed lipid feedstock, and optionally, a co-solvent, and optionally a catalyst, into the alcoholysis reactor or equivalent, thus making a reaction mixture of the natural oil feedstock and/or mixed lipid feedstock, and optionally a co-solvent, and optionally a catalyst, into an alcoholysis reactor or equivalent;

(ii) feeding at least one alcohol (as a solvent) and, optionally, a co-solvent, and, optionally, a catalyst, into the alcoholysis reactor or equivalent; thus making a reaction mixture of the natural oil feedstock and/or mixed lipid feedstock and at least one alcohol, and optionally, a co-solvent, and optionally, a catalyst, wherein the at least one alcohol and, optionally, co-solvent, is/are concurrently or counter-currently contacted with the lipid feedstock, and optionally, the at least one alcohol comprises one, two or multiple alcohols, and the molar ratio of at least one alcohol-to-feedstock in the reaction mixture is between about 1:1 to about 300:1, or about 200:1, or about 100:1, or about 70:1, or about 50:1, or about 40:1, and the mass ratio of the optional co-solvent-to-feedstock in the reaction mixture is between about 0.001:1 to 0.01:1 and about 1:1 to 5:1, or about 0.12:1, and the amount of the optional catalyst, if present, is between about 1 ppm to about 10,000 ppm (by weight) with respect to the mixed lipid feedstock, and optionally, the catalyst is a fixed bed inside the alcoholysis reactor or equivalent, and (iii) reacting the reaction mixture at a temperature of between about 150° C. to 350° C. and pressure of between about 1 to 350 bar, wherein optionally, water and/or at least one alcohol is/are removed during the formation of fatty acid alkyl ester, thereby producing the fatty acid alkyl esters; and (b) separating the crude fatty acid alkyl ester from at least one alcohol and/or water, either inside and/or outside the alcoholysis reactor, (c) optionally removing glycerin and/or water and/or the at least one alcohol (or removing substantially most or all of the glycerin and/or water and/or at least one alcohol, wherein optionally removing substantially most or all comprises removing over about 90%, 95%, 98%, 99%, 99.5% or more of the glycerin and/or water and/or at least one alcohol) from the crude fatty acid ester, and optionally the at least one alcohol is removed and/or recovered, or substantially removed and/or recovered (or about 90%, 95%, 98%, 99%, 99.5% or more or the at least one alcohol is removed and/or recovered); and (d) purifying the crude fatty acid alkyl ester via distillation and/or other means, thereby creating a first fatty acid alkyl ester and a first residual lipid phase, with mandatory recycling of at least a portion of the first residual lipid phase back to the system so as to increase the overall yield of fatty acid alkyl ester from saponifiable content and concentrate the unsaponifiable content, wherein optionally, the first residual lipid phase comprises one or multiple fractions that comprise saponifiable and/or unsaponifiable content, and optionally, at least a portion of the saponifiable content and/or unsaponifiable content is recycled back to the alcoholysis reactor, and optionally, the saponifiable content and/or unsaponifiable content that is not recycled back to the alcoholysis reactor is thereby either purged from the system and/or is subjected to further downstream reaction and/or separation so as to valorize (or recycle) the components of that stream, and optionally less than about 50%, 40%, 30%, 20% or 10% of saponifiable content and/or unsaponifiable content is subjected to further downstream reaction and/or separation, and optionally the method or industrial process further comprises a thermal hydrolysis, or a fat splitting, of the natural oil or the mixed lipid feedstock before step (a).

In alternative embodiments, the methods or industrial processes as provided herein further comprise subjecting the product mixture of step (a) to a flash separation step, wherein the pressure of the product mixture is reduced, optionally reduced to about atmospheric pressure, and the decrease in pressure results in an environment in which the vapor pressure of the unreacted alcohol allows for its evaporation from the reaction product mixture, wherein optionally, the pressure reduction from reactor pressure to atmospheric pressure comprises use of 1, 2, 3 or more steps, and optionally, the one or more flash steps generate a flashed product mixture wherein between about 0.01% and 99.9%, or approximately 90%, 91%, 92%, 93%, 94%, 95%, 97% or 99% or more, of the unreacted alcohol and/or water in the product mixture are separated and/or recovered from the product mixture, and optionally, the flashed alcohol is between about 140° C. and 250° C., and optionally, at least a portion of the flashed alcohol is utilized downstream for heat recovery and/or alcoholysis.

In alternative embodiments, the methods or industrial processes as provided herein further comprise an additional step of mixing the post-flashed reaction product mixture with water, optionally concurrently or counter-currently, and separating optionally via gravitational means or a gravitational force, to form a mixture of an aqueous stream comprising a glycerol and/or alcohol, and a crude fatty acid alkyl ester stream comprising fatty acid alkyl esters and, optionally, non-fatty acid alkyl ester saponifiables and unsaponifiables, wherein optionally, the method or means of gravitational separation comprises decantation, centrifugation, hydrocycloning, or any combination thereof, and optionally, the weight percent of glycerin remaining in the post-washed/separated crude fatty acid alkyl ester stream ranges from between about 0 to 1 wt %, and optionally, the amount of water used to wash the glycerol from the fatty acid alkyl ester does not exceed about 5%, 10%, 15%, 20%, 25% or 30% or more of the mass of the fatty acid alkyl ester stream.

In alternative embodiments, the methods or industrial processes as provided herein further comprise an additional step of separating the aqueous stream from the crude fatty acid alkyl ester stream, optionally in a gravity separator, wherein optionally the gravity separator comprises a decanter.

In alternative embodiments, the methods or industrial processes as provided herein further comprise an additional step of concentrating and/or refining the glycerol from the aqueous stream, optionally in a stripping column or equivalent, thereby producing a glycerol product that contains less than about 1 wt % salt content, wherein optionally, the concentrated glycerin is equal to splitter crude grade from thermal fat splitting, or a glycerol product that is about 75%, 80% or 85% or more glycerol or is USP-grade, or is substantially pure, wherein optionally substantially pure glycerol product has at least about 90%, 92%, 93%, 94%, 95%, 96%, 97% or 98% or more glycerol, or is at least about 99% glycerol, or the pure glycerol product has between about 95% to about 99.9% glycerol.

In alternative embodiments, the methods or industrial processes as provided herein further comprise a step comprising subjecting at least a portion of, or substantially all of, the crude fatty acid alkyl ester stream to a forced circulation drying step wherein substantially all of the water and/or alcohol (e.g., about 90%, 95%, 98%, 99% or 99.5% or more of the water and/or alcohol) in the crude fatty acid alkyl ester stream is removed, and optionally between about 95% or 98% and 99.9% or 100% of the water and/or alcohol remaining in the crude fatty acid alkyl ester stream is removed, and optionally, at least a portion of the crude fatty acid alkyl ester stream represents between 0.01% to 80% and substantially all of the crude fatty acid alkyl ester stream represents between 80% to 100%, and optionally, the forced recirculation evaporator is maintained at about 150° C. to about 300° C. and from about 50 Torr absolute to 10 barg, and optionally, the residence time of the crude fatty acid alkyl ester stream in the forced recirculation evaporator is between about 0.1 hours to 8 hours, and optionally, at least a portion of the crude fatty acid alkyl ester stream being dried undergoes simultaneous alcoholysis by continuously injecting at least a portion of the hot flashed alcohol into the stream at one or multiple points in the forced recirculation evaporator and continuously removing alcohol with the water formed from esterification of free fatty acids, optionally, at least a portion of the crude fatty acid alkyl ester stream being dried undergoes simultaneous glycerolysis, either by utilizing only the remaining glycerin in the stream or by adding glycerin up to about 2 wt % of the stream, thereby producing a dried crude fatty acid alkyl ester stream with acid value of about 4, 3, 2 or 1 or less and moisture content of less than about 0.5 wt %.

In alternative embodiments, methods or industrial processes as provided herein further comprise a step of subjecting the dried crude fatty acid alkyl ester stream to distillation to produce a first fatty acid alkyl ester and a first residual lipid phase, wherein optionally, the first fatty acid alkyl ester produced contains an acid value between 0 and 3, thereby producing a first fatty acid alkyl ester than can meet the B100 specification for biodiesel.

In alternative embodiments, methods or industrial processes as provided herein further comprise a step of subjecting the first fatty acid alkyl ester to a chemical neutralization and separation step to reduce the acid value to meet the B100 specification for biodiesel if it does not already meet the B100 specification, wherein optionally, chemical neutralization is conducted with one or more hydroxides, carbonates, oxides, bicarbonates, amines, or any combination thereof, and optionally, chemical neutralization is aided by the addition of up to about 10% volume of water, or up to between about 5% to 15% volume of water, with respect to the fatty acid alkyl ester, and optionally, after the chemical neutralization step has been concluded, the neutralized mixture is subjected to a separation step that comprises centrifugation, decantation, filtration, or any combination thereof, thereby producing a neutralized fatty acid alkyl ester that can meet, or substantially meet, the B100 specification for biodiesel.

In alternative embodiments, methods or industrial processes as provided herein further comprise a step of subjecting the neutralized fatty acid alkyl ester to a drying step to reduce the moisture content to meet the B100 specification for biodiesel if it does not already meet the B100 specification, wherein optionally, the starting moisture content is less than 0.5 wt %, and optionally, the neutralized fatty acid alkyl ester is subjected to a washing or adsorption step to remove any residual metals content prior to drying, thereby producing a dried fatty acid alkyl ester that can meet, or substantially meet, the B100 specification for biodiesel.

In alternative embodiments, methods or industrial processes as provided herein further comprise a step of subjecting the crude fatty acid alkyl ester of step (d) to a neutralization step that reduces the acid value by 0.01% to 100% and results in a deacidified, or substantially deacidified, crude fatty acid alkyl ester, wherein optionally, the neutralization step produces solid fatty acid soaps, and optionally, if solid fatty acid soaps are produced, they are either allowed to remain with the deacidified, or substantially deacidified, crude fatty acid alkyl ester or they are removed, and optionally, if the solid fatty acid soaps are removed from the deacidified, or substantially deacidified, crude fatty acid alkyl ester, the solid fatty acid soaps contain entrained deacidified, or substantially deacidified, crude fatty acid alkyl ester, and optionally, the solid fatty acid soaps entrained with deacidified, or substantially deacidified, crude fatty acid alkyl ester are washed with the same alcohol used in the alcoholysis reaction so as to recover substantially all of the deacidified, or substantially deacidified, crude fatty acid alkyl ester.

In alternative embodiments, the methods or industrial processes as provided herein further comprise a step of subjecting the crude fatty acid alkyl ester, the dried crude fatty acid alkyl ester, the deacidified, or substantially deacidified, crude fatty acid alkyl ester, or any combination thereof to one or multiple separation steps, and optionally the separation step comprises an evaporative step, and optionally the evaporative step comprises distillation, thereby creating a first fatty acid alkyl ester stream and a first residual lipid stream wherein optionally, the crude fatty acid alkyl ester is dried and/or desolventized in the same process unit that also produces a first fatty acid alkyl ester and a first residual lipid stream, and optionally, at least a portion of the crude fatty acid alkyl ester stream undergoes glycerolysis that reduces the acid value of the stream from 0.01 to 100%, and optionally, a first fatty acid alkyl ester stream meets the B100 specification as a result of one or multiple separation steps conducted on the crude fatty acid alkyl ester, and optionally, the first fatty acid alkyl ester stream does not meet the B100 specification as a result of one or multiple separation steps conducted on the crude fatty acid alkyl ester and thus requires one or multiple steps to produce a fatty acid alkyl ester stream that meets the B100 specification.

In alternative embodiments, the methods or industrial processes as provided herein further comprise a step comprising subjecting the first fatty acid alkyl ester and/or the first residual lipid stream to one or multiple upgrading steps so as to maximize the value of the streams created, wherein optionally, one or multiple upgrading steps comprise neutralization of fatty acid via base, filtration, liquid to liquid (liq-liq) extraction, chromatography, ion exchange, crystallization, glycerolysis, drying, and esterification, and optionally, any stream before and/or after an upgrading step is recycled back to the system so as to increase the yield of fatty acid alkyl esters.

In alternative embodiments, the neutralization of fatty acid via base is conducted with an alkaline reagent comprising any oxide, hydroxide, carbonate, bicarbonate, ion exchange resin, or equivalents, or any combination thereof.

In alternative embodiments, the neutralization of fatty acid via base produces a fatty acid soap that is removed from the fatty acid alkyl ester by one or multiple methods comprising filtration, centrifugation, washing, adsorption, ion exchange, or equivalents, or any combination thereof.

In alternative embodiments, the fatty acid soap removed from the fatty acid alkyl ester comprises sodium, potassium, calcium, magnesium, iron, aluminum, or any combination thereof, wherein optionally, the fatty acid soap removed from the fatty acid alkyl ester comprises entrained fatty acid alkyl ester, and optionally, the entrained fatty acid alkyl ester can be recovered by one or multiple steps comprising washing, evaporation, solid-liquid extraction, acidulation or equivalents.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

DESCRIPTION OF DRAWINGS

The drawings set forth herein are illustrative of embodiments as provided herein and are not meant to limit the scope of the invention as encompassed by the claims.

Like reference symbols in the various drawings indicate like elements.

Figure 1:
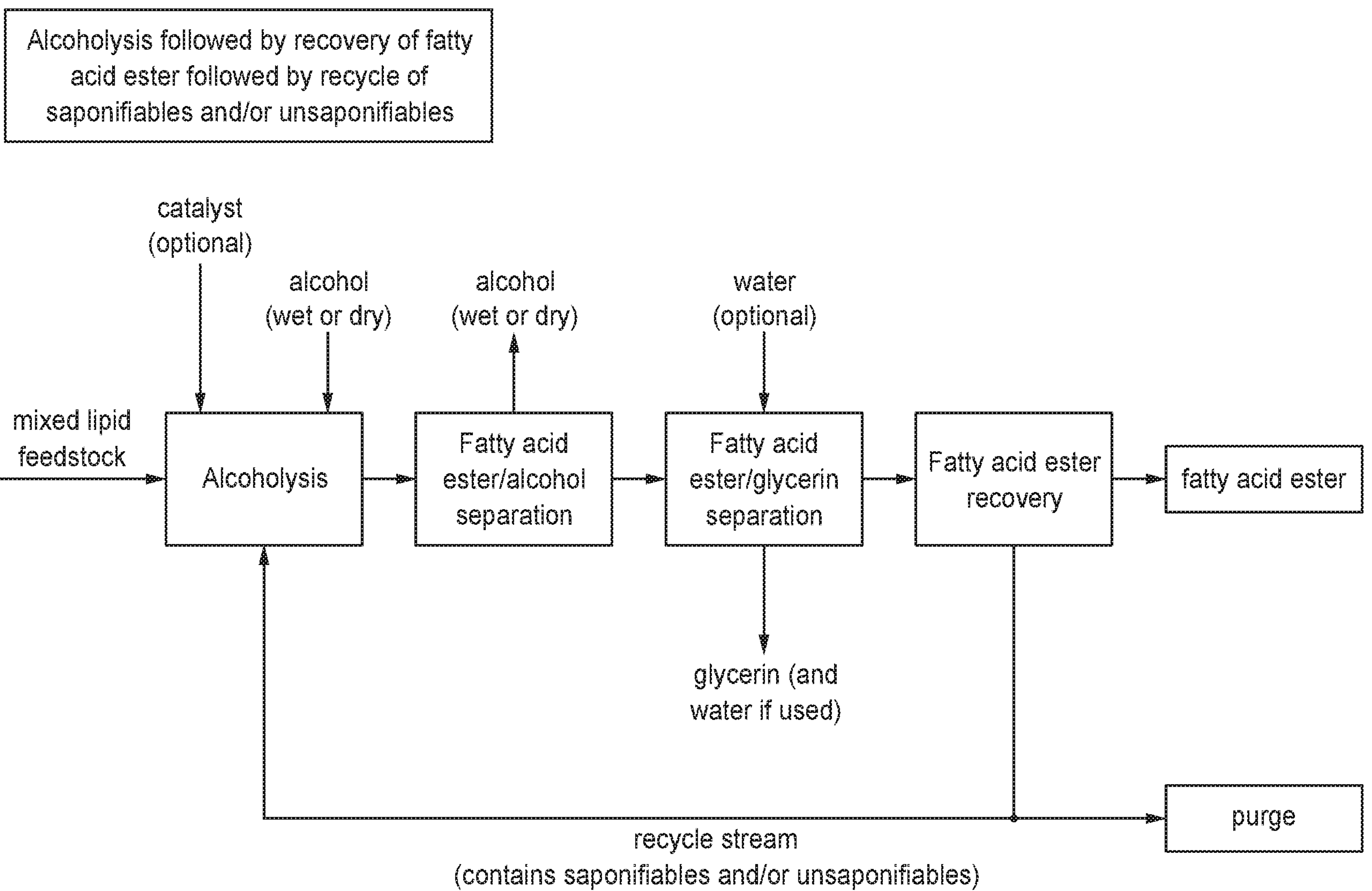
FIG. 1 illustrates a diagram showing the entire configuration of an exemplary apparatus for carrying out an exemplary method as provided herein for preparing fatty acid alkyl esters.
Figure 2:
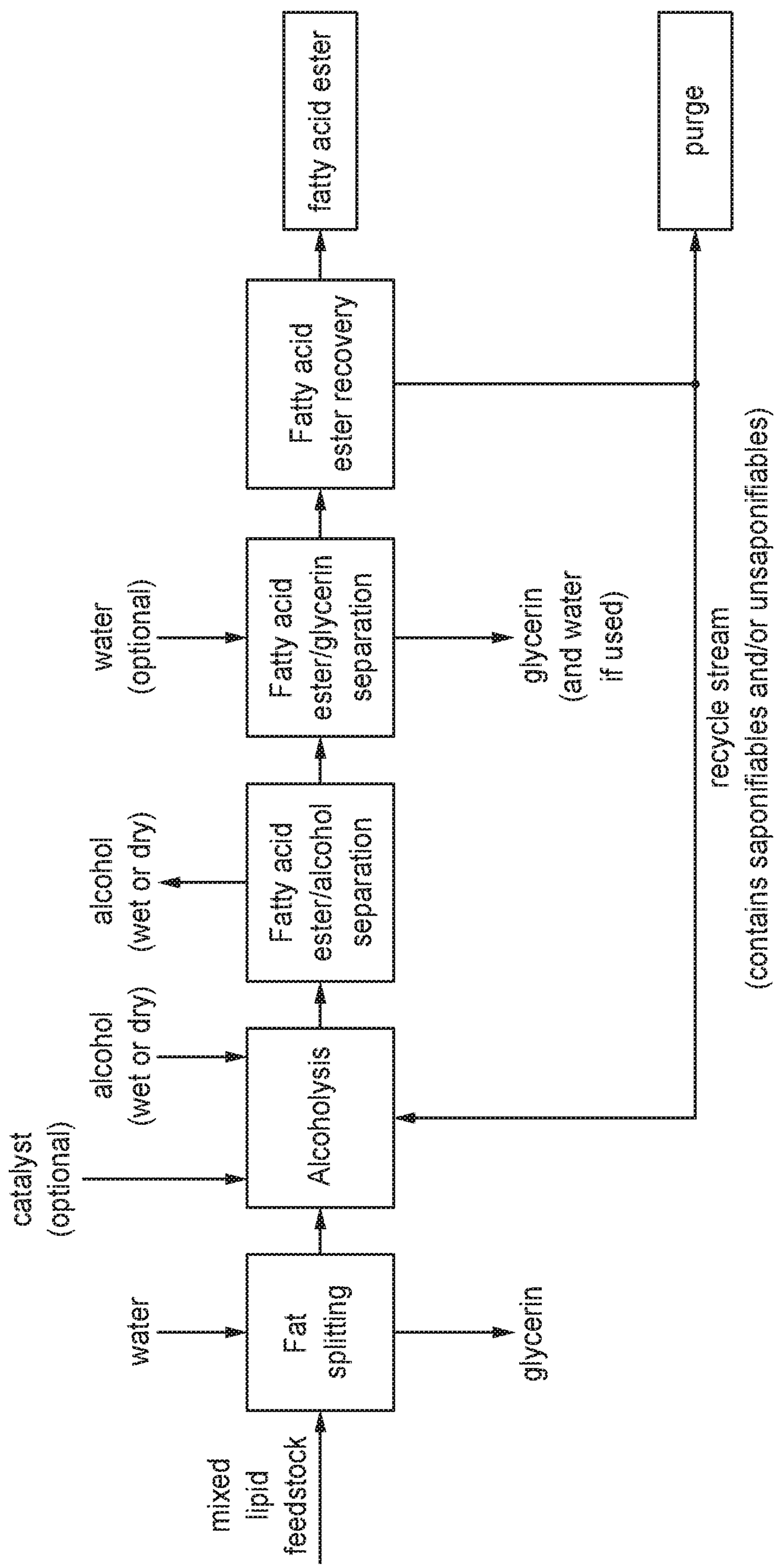
FIG. 2 illustrates a diagram showing an alternative configuration of an exemplary apparatus for carrying out an exemplary method as provided herein for preparing fatty acid alkyl esters.

Reference will now be made in detail to various exemplary embodiments, examples of which are illustrated in the accompanying drawings. The following detailed description is provided to give the reader a better understanding of certain details of aspects and embodiments as provided herein, and should not be interpreted as a limitation on the scope of the invention.

DETAILED DESCRIPTION

In alternative embodiments, provided are systems and processes for the economically efficient preparation of high-quality biodiesel and optionally other products from the natural oil feedstocks, wherein the systems and processes comprise one or more reactions comprising mixing the natural oil and/or mixed lipid feedstock with an alcohol and driving the reaction using temperature and pressure alone, i.e. without the use of any catalyst, the use of which is the standard in the art for producing biodiesel products from natural oils and/or mixed lipid feedstocks. In alternative embodiments, the systems and processes as provided herein are more economical and efficient than currently used approaches for the generation of biodiesel from natural oils and/or mixed lipid feedstocks. In alternative embodiments, the feedstock, including the natural oils and/or mixed lipid feedstocks used to practice the methods and processes provided herein, is comprised of lipids derived from (e.g., isolated from) or equivalent to: a natural source, e.g., a bacterial, algae, kelp, plant or an animal source, or a bioengineered source.

In alternative embodiments, the methods or industrial processes comprise recycling of unreacted saponifiables (e.g., saponifiables comprising complex lipids such as triglycerides, phospholipids, glycolipids, sphingolipids, and the waxes) after the distillation of fatty alkyl esters back to the alcoholysis reactor to increase yield.

In alternative embodiments, a system (e.g., for practicing methods or industrial processes as provided herein) is provided for converting natural oil and/or mixed lipid feedstocks into high-quality biodiesel without the use of any catalysts based on the composition of the natural oil feedstock used in the system. In alternative embodiments, the system is comprised of multiple operational units that are configured in alternative arrangements to accommodate the composition of the feedstock that is being converted to biodiesel and optionally other products.

In alternative embodiments, the system is configured in a single-stage process wherein a natural oil feedstock and/or mixed lipid feedstock is mixed with an alcohol and the resulting mixture is heated and pressurized to above the critical temperature and pressure of the alcohol. The reaction conditions allow for the saponifiables in the feedstock to undergo a transesterification and/or esterification reaction with the alcohol to generate fatty acid alkyl esters. The foregoing process is particularly suited to natural oil feedstocks and/or mixed lipid feedstocks comprising primarily glycerides but also a relatively high percentage (for example, greater than about 10%) of FFAs. In conventional biodiesel processing approaches, a high FFA content of the feedstock decreases the efficiency of the process by reacting with the base (e.g. NaOMe) catalyst.

In alternative embodiments, the system is configured in a 2-stage process wherein the natural oil feedstock and/or mixed lipid feedstock is subjected to fat splitting with water, either concurrently or countercurrently. If glycerin is formed during the splitting of the feedstock with water, then the glycerin may optionally be subjected to upgrading to splitter crude (e.g., about 80% purity) and/or USP grade.

In alternative embodiments, the resulting FFAs are then mixed with at least one alcohol and the resulting mixture is heated and pressurized to above the critical temperature and pressure of the at least one alcohol. The reaction conditions allow for the FFAs in the feedstock to undergo an esterification with the at least one alcohol to generate fatty acid alkyl esters.

In alternative embodiments, a system as provided herein is "feedstock flexible", meaning that the system is configured to process natural oils and/or mixed lipid feedstocks with any free fatty acid content (i.e. any ratio of esters, e.g. glycerides, to free fatty acid) to and any fatty acid profile (e.g. percent saturated and unsaturated fatty acids). This exemplary embodiment provides a significant improvement over prior approaches to converting natural oil feedstocks and/or mixed lipid feedstocks to biodiesel in which systems are configured to handle a narrow range of feedstocks and are limited in their ability to process feedstocks comprising high FFA content, e.g. feedstocks with greater than 10% FFA.

In alternative embodiments, a system is provided that replaces conventional fatty acid methyl ester production from lauric oils, e.g., coconut oil and/or palm kernel oil. This can be useful in the formation of oleochemical building blocks.

In alternative embodiments, enzymes are used to hydrolyze the natural oil feedstock and/or mixed lipid feedstock before the alcoholysis reaction.

In alternative embodiments, a catalyst or catalysts may be used to aid in hydrolyzing the natural oil feedstock and/or mixed lipid feedstock.

In alternative embodiments, a catalyst or catalysts may be used to aid in the esterification and/or transesterification (e.g., alcoholysis) of the natural oil feedstock and/or mixed lipid feedstock.

In alternative embodiments, the systems and processes provided are used to isolate compounds with low or no volatility, for example, sterol esters, oryzanol, tocopherols, squalene, and the like. In one embodiment, fatty acid alkyl esters are first formed by the systems and processes described, then separated from the low volatility components by distillation or other means. This is a useful approach for the isolation of specialty and fine chemical compounds.

In alternative embodiments, the crude reaction mixture from the alcoholysis reactor is separated by a gravitational process or means immediately following the alcoholysis reaction. Gravitational separation processes can comprise use of decantation and/or centrifugation and/or other means of separation utilizing natural or artificial forces of gravity. Gravitational separation can result in at least a top phase (mainly crude fatty acid alkyl esters) and a bottom phase (mainly water; optionally including alcohol and/or glycerin and/or fatty soap).

In alternative embodiments, fatty acid alkyl esters are recovered from the crude fatty alkyl ester reaction product via evaporative measures following a drying section, for example, by distillation with stripping and rectification sections.

In alternative embodiments, hydrodynamic cavitation may be used in one or multiple locations of the methods and/or industrial processes described. This helps to intensify the process by creating a large pressure drop across a relatively small area. In alternative embodiments, this reduces process parameters, including temperature or residence time, resulting in lower capital and operating costs.

In alternative embodiments, reactive distillation is utilized in one or multiple locations of the methods and/or industrial processes described. Reactive distillation helps to push equilibrium toward higher formation of products, which can be useful in optimizing conventional reactor and distillation systems to achieve more desirable results.

In alternative embodiments, fatty acid alkyl esters (that are separated from other saponifiables and/or unsaponifiables) can be contaminated with organic acids, e.g. fatty acids. For B100 biodiesel, a low acid value specification must be met before the fuel can be sold. To reach this specification, any method known in the art may be used to reduce and/or remove the organic acid, e.g. fatty acid, contaminants from the fatty acid alkyl ester stream. These methods include, but are not limited to: distillation, neutralization with base, adsorption/absorption with a solid phase, liquid-liquid extraction, crystallization, and the like.

Exemplary Single-Stage Processes

In alternative embodiments, provided are systems and processes for the economically efficient preparation of high-quality biodiesel and high-quality glycerol from oils, e.g., natural oils, comprising a high percentage (e.g. >10%) of organic acids, e.g. free fatty acids. In alternative embodiments, provided are systems and processes for the production of biodiesel meeting or exceeding the specifications for B100 biodiesel set forth in ASTM Specification D6751-14, as well as a glycerol co-product meeting or exceeding the standards for U.S. Pharmacopeial Convention (USP)-grade glycerol from natural oil feedstocks comprising high percentages of organic acids, e.g. free fatty acids. In alternative embodiments, natural oil feedstocks with high organic acid content are subjected to a transesterification reaction with an alcohol under conditions at or above the critical temperature and pressure of the alcohol in the absence of any catalyst. In alternative embodiments, the systems and processes as provided herein are more economical and efficient than currently used approaches for the generation of biodiesel from natural oils.

In alternative embodiments, a "feedstock" is the starting material of a process or method as provided herein; and in alternative embodiments, noting that processes and methods as described herein are not limited by any particular mechanism of action, a "feedstock" is a starting material that undergoes a transesterification reaction to form a product mixture. In alternative embodiments, the feedstock, including the "natural oil feedstock", is comprised of lipids derived from (e.g., isolated from) or equivalent to a natural source, e.g., a bacterial, algae, plant or an animal source, or a bioengineered source, wherein in alternative embodiments the feedstock comprises at least about 10% wt/wt free organic acids, e.g. free fatty acids (hereafter referred to as free fatty acids and abbreviated FFAs), e.g. between about 1% wt/wt FFAs to about 100%, or between about 10% wt/wt FFAs to about 99% wt/wt FFAs, or between about 15% wt/wt to about 25% wt/wt FFAs. In alternative embodiments, the feedstock is a corn oil feedstock. In alternative embodiments, the feedstock is "distillers corn oil" obtained from ethanol production facilities and is a by-product of the ethanol production process from corn kernels. In alternative embodiments, the feedstock is from (e.g., isolated from) or derived from a corn oil, a distillers corn oil, a linseed oil, a flaxseed oil, a cottonseed oil, a rapeseed (canola) oil, a peanut oil, a sunflower oil, a safflower oil, a coconut oil, a palm oil, dende oil, an oil from a plant of the genus *Elaeis* or *Attalea*, a soybean oil, a fatty acid distillate, an acid oil, an algal oil, a microbial oil, a crude edible oil, or any combination thereof.

In alternative embodiments, a "supercritical alcohol" is an alcohol at or above the critical temperature and pressure of the alcohol. At or above the critical point of the alcohol, distinct liquid and gas phases do not exist, and the phase-boundary between liquid and gas is terminated. Different alcohols have distinct critical temperatures and pressures. For example, in alternative embodiments, methods as provided herein comprise use of conditions wherein methanol is supercritical, for example, under conditions where methanol is supercritical comprising at or above a temperature of approximately 240° C. and pressure of approximately 1173 psig (80.9 bar), or equivalents. In alternative embodiments, methods as provided herein comprise use of conditions wherein ethanol is supercritical, for example, under conditions where ethanol is supercritical and comprising at or above a temperature of approximately 241° C. and pressure of approximately 890 psig (61.4 bar), or equivalents.

In alternative embodiments, the at least one alcohol used in a reaction or a process as provided herein contains one or multiple alcohols that are between 1 and 5 carbons, or 1, 2, 3, 4, 5 or 6 or more carbons, e.g. methanol, ethanol, propanol, butanol, isobutanol, isopropyl alcohol or a combination thereof. In various other embodiments, conditions may be such that a higher alcohol containing more than 5, 6, 7, or 8 or more carbons are used. For purposes of this discussion, methanol is used as the at least one alcohol, however those skilled in the art would understand that other alcohols could be used.

In alternative embodiments, "biodiesel" refers to a fuel product comprised primarily of, or substantially of, fatty acid alkyl esters (e.g., a product having less than about 10%, 9%, 8%, 7%, 6%, 5%, 4%, 3%, 2%, 1%, 0.8%, 0.6%, 0.4%, or less FFAs) derived from the transesterification of a natural oil feedstock with an alcohol. The composition of the fatty acid alkyl esters will depend on the at least one alcohol used in the transesterification reaction. For example, if methanol is the at least one alcohol used in the reaction, the fatty acid alkyl esters will be fatty acid methyl esters (FAME). If ethanol is the at least one alcohol used in the reaction, the fatty acid alkyl esters will be fatty acid ethyl esters (FAEE). Various specification and standards have been established to characterize biodiesel fuels and blend stocks for example, the American Society of Testing and Manufacturing (ASTM) D6751-14 "Standard Specification for Biodiesel Fuel Blend Stock (B100) for Middle Distillate Fuels" which is incorporated herein in its entirety. In alternative embodiments, the biodiesel produced meets or exceeds those specifications established by ASTM D6751-14.

In alternative embodiments, "USP-Grade glycerol" or "food-grade glycerol" is a glycerol product meeting or exceeding the standards set forth by the U.S. Pharmacopeial Convention (USP) for classification as a "USP-grade" glycerol. In alternative embodiments, the systems and methods as provided herein result in the production of USP-grade glycerol as a co-product to the production of biodiesel.

In alternative embodiments, a "co-solvent" is a product that increases the solvolysis activity of the reaction mixture, thereby enabling a more complete conversion of lipids to biodiesel, or a fuel product comprising substantially fatty acid alkyl esters, and increasing the overall yields of the process. In alternative embodiments, the methods and processes as provided herein comprise the addition of a co-solvent to the reaction mixture (the mixture of the at least one alcohol and the feedstock). The co-solvent can be, for example, a water, a hydrocarbon or hydrocarbon mixture, or carbon dioxide ($CO_2$). In the disclosure that follows, $CO_2$ is the co-solvent used, although those skilled in the art will appreciate that other co-solvents may be substituted in alternative embodiments.

Exemplary Processes—a Corn Oil Feedstock

In alternative embodiments, a continuous process is provided for the production of biodiesel and glycerol from a natural oil feedstock comprising high levels of FFAs, e.g. corn oil, such as oil from distiller's corn oil. In alternative embodiments, methods and processes as provided herein do not include the use of a catalyst in the transesterification reaction; and in alternative embodiments result in a ASTM "B100" grade biodiesel and/or a USP-grade glycerol co-product.

In alternative embodiments, a corn oil feedstock comprising FFAs in the amount of approximately 10% wt by weight of the feedstock, e.g. about 15% FFAs, is combined with methanol that is essentially or substantially free of any contaminates, e.g. about 99.0% methanol, to form a reaction mixture. The molar ratio of methanol to oil in the reaction mixture can be between about 1:1 to 5:1 and about 50:1 to 70:1, e.g., the molar ratio can be about 20:1, 30:1, 40:1, 50:1 or 60:1. Once the at least one alcohol and feedstock are combined, they are subjected to mixing, e.g. mechanical sheer and or sonication mixing, or equivalents, to form an emulsion. The feedstock and alcohol can be mixed (or equivalent) for between about 5 to about 180 minutes, e.g. about 40, 50, 60, 70, 80 or 90 or more minutes or however much time is needed to form an emulsion. If sonication is selected as the method of mixing, the frequency range can be between about 20 to 100 kHz, e.g. about 42 kHz.

In alternative embodiments, the emulsified reaction mixture is then pumped into reactor comprising a series of concentric metal heat exchangers via a positive displacement pump (or other suitable pump type) wherein the pressure exerted on the reaction mixture is between about 500 psig (35.5 bar) to about 5000 psig (355 bar), e.g. about 2000 psig (139 bar), as measured at the discharge of the pump. Directly after the discharge of the high-pressure pump, a co-solvent and/or additional FFAs (e.g., FFAs of different structure as in the initial mix) may be added to the reaction mixture, e.g., via a port or equivalent that is operationally connected to the discharge area of the pump. The co-solvent-to-alcohol mass ratio can be between about 0.001:1 to 0.01:1 and about 1:1 to 5:1, e.g. about 0.12:1. The FFA-to-reaction solution weight ratio can be between about 0.001:1 to 0.01:1 and about 1:1 to 10:1, or the FFA-to-reaction solution weight ratio can be about 0.3:1.

In alternative embodiments, the pressurized reaction mixture, comprising the feedstock, alcohol, and the optional co-solvent and/or FFAs are then heated to a temperature in the range of between about 100° C. to about 500° C., or 200° C. to about 400° C., e.g. 290° C. The reaction mixture is maintained at the desired temperature and pressure and allowed to react for between about 1 minute to about 300 minutes (min.), e.g. about 20, 30, 40, 50, 60, 70, 80 or 90 or more min., or between about 10 and 100 min. During the reaction, the supercritical methanol undergoes a transesterification reaction with any triglycerides present in the feedstock to yield FAME and glycerol. Substantially all of the FFAs (e.g., about 90%, 95%, 98%, 99% or 99.5% or more FFAs) present in the feedstock undergo an esterification reaction with the alcohol to form FAME and substantially all of the esters (e.g., about 90%, 95%, 98%, 99% or 99.5% or more of the esters) in the feedstock, e.g. lipids, phospholipids or other esters, will similarly be subjected to esterification or transesterification to yield FAME.

In alternative embodiments, the resulting product mixture will comprise FAME, water, unreacted methanol, glycerol, co-solvent (if present in the reaction mixture) and possibly other products.

In alternative embodiments, following the reaction, the product mixture (i.e. the product mixture in which the organic acids are substantially esterified and the esters are substantially transesterified; (e.g., about 80%, 85%, 90%, 95%, 98%, 99% or 99.5% or more esterified) is discharged from the reactor, e.g., via a high-pressure pump or equivalent, and passed through a heat exchanger, e.g., a high pressure concentric heat exchanger (wherein the pressure is maintained at the level of the reactor), wherein the heat is withdrawn from the product mixture and optionally recovered (where the heat can be recycled for use elsewhere in the process, e.g. to heat the reactor, thereby decreasing the overall energy requirements of the system). In alternative embodiments, the solution then passes through a back-pressure regulator device at a temperature of between about 125° C. to about 350° C., or between about 150° C. to about 300° C., e.g. about 240° C.

In alternative embodiments, following the heat recovery step, the product mixture undergoes a flash process wherein the product mixture is transferred to a flash drum or appropriate or equivalent vessel wherein the pressure is reduced from the pressure within the heat exchanger, e.g. above 1171 psig (81.8 bar) or about 1200 psig (83.8 bar), to, for example, about atmospheric pressure, or about less than 14 psig (1.98 bar), e.g. less than 1 psig (1.08 bar), or about 0.1 psig (1.02 bar). The decrease in pressure results in an environment in which the vapor pressure of the methanol exceeds its external pressure (the pressure of the flash drum or vessel), allowing for the methanol, co-solvent (if present)

and water (collectively referred to as "the solvent" in this and subsequent steps) to vaporize or "flash" out of the product mixture.

A flash at 0.1 psig (1.02 bar) results in approximately 95% of the solvent present in the product mixture to vaporize and leave the flash vessel, with approximately 5% of the solvent remaining in a liquid state and exiting the bottom of the flash unit along with the remaining products in the product mixture (i.e. the "biodiesel stream"). In such exemplary embodiments, the concentration of solvent (i.e. methanol/solvent/water) leaving the flash unit in a liquid state (in the ester stream) is approximately 2 wt. % of the ester stream.

In alternative embodiments, the biodiesel stream (comprising FAME and glycerol, as well as the water and alcohol that was not separated in the previous flash step) leaves the flash unit at a temperature in the range of between about 110° C. to about 125° C., e.g. 115° C. and is sent to a heat exchanger, e.g. a standard shell and tube heat exchanger, wherein it is cooled, e.g., to about 95° C. The recovered heat can be recycled for use in the process, e.g. to heat the reactor.

In alternative embodiments, the solvent mixture (the methanol/water/and, if present, co-solvent mixture obtained from the previous flash separation step) (wherein the mixture can be approximately 95 wt % methanol or 95 wt % methanol/co-solvent (if co-solvent is present) and approximately 5 wt % water) is then distilled to yield a substantially pure methanol, e.g., methanol product, e.g. approximately 99.8% or more methanol, or e.g., about 80%, 85%, 90%, 95%, 98%, 99% or 99.5% or more pure methanol. The substantially pure methanol product can be recycled to the methanol supply tank for use in subsequent reactions. If present the co-solvent is distilled in the same distillation step to yield a substantially pure co-solvent product, e.g. 99.8% pure co-solvent, or (e.g., about 80%, 85%, 90%, 95%, 98%, 99% or 99.5% or more pure co-solvent). The substantially pure co-solvent can be recycled to for use in subsequent reactions.

In alternative embodiments, after the biodiesel stream is cooled via the heat exchanger, it is transferred to an inline static mixer wherein it is mixed with soft water in a ratio of about 50:1 biodiesel stream-to-water by mass, or in a ratio of 1 g water-to-glycerol by mass. In alternative embodiments, the water and biodiesel stream mixture is then transferred to a decanter, or equivalent, wherein a biodiesel stream and an aqueous stream are formed and which can be separated.

In alternative embodiments, the aqueous stream that leaves the decanter comprises methanol, water (including water that was not removed in the flash separation step and water introduced in the present glycerol recovery/water-wash step) and glycerol, and optionally the aqueous stream is then transferred to a glycerol stripping column, e.g. a 4-stage stripping column or a 6-stage stripping column, in which the aqueous stream is introduced to the top of the column and, upon contacting the bottom of the column, the aqueous stream is heated such that a vapor phase, comprising primarily methanol and water, is generated and rises to the top of the column where it is removed. In this exemplary embodiment, the column "bottoms" are a primarily a glycerol product in the range from between about 85 wt % to about 99.9 wt % glycerol, e.g. about 99.5% glycerol, which can be marketed directly as "splitter crude" grade glycerol or upgraded through techniques known in the art to a USP grade tech glycerol.

In alternative embodiments, the contents of the separated vapor phase comprising water and methanol will vary depending the composition of the feedstock. In one embodiment, e.g., in which corn oil feedstock, the water/methanol product is approximately 55% methanol and 45% water. In alternative embodiments, the alcohol (e.g. methanol)/water product is sent to an alcohol recovery unit where it is distilled to yield a substantially pure alcohol, e.g., methanol, product.

In alternative embodiments, the biodiesel stream separated from the decanter is then heated to between about 150° C. to about 220° C. via a shell-and-tube heat exchanger and is allowed to flash at an absolute pressure in the range of between about 0 psig (1.013 bar) to about 10 psig (1.7 bar), e.g. 1 psig (1.08 bar). In this flash step, substantially any excess water contained in the biodiesel stream from the decanting step is removed, thereby "drying" the biodiesel fraction in order to meet the water content specifications for ASTM B100 biodiesel. A portion of the FAME (e.g. <5%) in the flash process stream is evaporated with the water in the flash/dryer unit. In alternative embodiments, this material is condensed in a shell-and-tube condenser and is routed back to the process fluid while the temperature is regulated below the methanol/water vapor dew point. In so doing, it remains as a vapor and is routed out of the system.

In alternative embodiments, the "bottoms" of this flash/drying unit are then sent to a distillation column wherein any other contaminates produced during the transesterification reaction, e.g. waxes, unreacted lipids, FFAs, tocopherols, or sterols, or the like, are separated from the FAME to yield a distillate stream comprising ASTM B100-grade biodiesel. In alternative embodiments, if the distillate does not meet the B100 specification it can be chemically neutralized to effectively reduce the acid value to meet the B100 specification. In alternative embodiments, the "bottoms" of the distillation column in the present step are then sent back to the beginning of the process to be combined with the corn oil feedstock for use in subsequent reactions. In alternative embodiments, at least a portion of the bottoms material is sent to one or more additional separation steps to valorize one or multiple components in the stream.

Exemplary 2—Stage Processes

In alternative embodiments, provided are systems and processes for the economically efficient preparation of high-quality biodiesel and high-quality glycerol natural oils, e.g. natural oils comprising a high percentage (e.g., greater than 10%) of organic acids, e.g. free (un-esterified) fatty acids. In alternative embodiments, provided are systems and processes for the production of high-purity biodiesel, e.g. a biodiesel meeting or exceeding the specifications for B100 biodiesel set forth in ASTM Specification D6751-14, as well as a high-purity glycerol co-product, e.g. a glycerol meeting or exceeding the standards for U.S. Pharmacopeial Convention (USP)-grade glycerol from natural oil feedstocks, e.g. natural oil feedstocks comprising high percentages (e.g., greater than (>) 10%) of free fatty acids.

In alternative embodiments, the process is a 2-stage process comprising a first hydrolysis stage and a second esterification stage. In alternative embodiments, natural oil feedstocks with high free (un-esterified) fatty acid content are subjected to a first hydrolysis reaction comprising mixing or contacting the natural oil feedstock with water and allowing the mixture to react at a temperature and a pressure below the critical temperature and pressure of water (i.e. below about 374° C. and about 3200 psig) (222 bar) to generate a reaction product mixture comprising free fatty acids (FFAs), separating or isolating the generated free fatty acids, mixing or contacting the separated or isolated free fatty acids with an alcohol and a co-solvent and allowing the mixture to react at a temperature and a pressure above the critical temperature and pressure of the selected alcohol, thereby causing the free fatty acids to undergo an esterification reaction with the alcohol to generate fatty acid alkyl esters.

In alternative embodiments, the first stage of the process comprises a subcritical water reaction wherein the feedstock, e.g. a natural oil feedstock comprising about 2.5%, 5%, 10%, 15%, 20%, 30% or 40% or more free fatty acids by weight of the feedstock, is mixed with water and allowed to react at a temperature between about the boiling point of the water at atmospheric pressure (about 14.7 psig, (2.03 bar), for example, at about 100° C.) and the critical temperature of water, i.e. about 374° C., and wherein the pressure of the reaction is sufficient to maintain the water in a liquid state (i.e., at a pressure equal to or greater than the vapor pressure of the water at the specified reaction temperature). In alternative embodiments, the hydrolysis reaction may happen concurrently or counter-currently. In alternative embodiments, the systems and processes as provided herein are more economical and efficient than currently used approaches for the generation of biodiesel from natural oils.

In alternative embodiments, a "feedstock" is the starting material of a process or method as provided herein; and in alternative embodiments, noting that process and method embodiments as provided herein are not limited by any particular mechanism of action, a "feedstock" is a starting material of a process or method as provided herein that undergoes a first hydrolysis reaction to form a first product mixture and a second esterification/transesterification reaction to form a product mixture. In alternative embodiments, the feedstock is comprised of (comprises) lipids derived from a natural source, e.g., a plant or an animal source, wherein in alternative embodiments the feedstock comprises at least about 1% wt/wt free organic acids, e.g. free fatty acids (hereafter referred to as free fatty acids and abbreviated FFAs), e.g. between about 1% wt/wt FFAs to about 100%, or between about 10% wt/wt FFAs to about 100% wt/wt FFAs, or between about 15% wt/wt to about 25% wt/wt FFAs. In alternative embodiments, the process is feedstock-flexible and is not limited by the ester or free fatty acid content of the feedstock. In certain embodiments, the feedstock used in the process is comprised of 100% esters, e.g. 100% triglycerides or a combination of any of mono- di- and triglycerides in any amount, or the feedstock used in the process is substantially esters. In alternative embodiments, in addition to the FFAs, the feedstock is comprised primarily of, or substantially comprises, triglycerides with carboxylic acid moieties containing between 6 and 28 carbon atoms. In alternative embodiments, the feedstock further comprises smaller amounts of phospholipids, mono- and di-glycerides with carboxylic acid moieties containing between 6 and 28 carbon atoms, and/or non-ester components e.g. waxes, sterols, tocopherols, hydrocarbons and the like.

In alternative embodiments, the feedstock is a corn oil feedstock. In alternative embodiments, the feedstock is "corn stillage oil" obtained from ethanol production facilities and is a by-product of the ethanol production process from corn kernels.

In alternative embodiments, the natural oil feedstock is "crude" or "unrefined", meaning it has not been treated to remove, for example, free fatty acids, phospholipids (gummed) or other components of the "crude" oil.

In alternative embodiments, a "supercritical alcohol" is an alcohol at or above the critical temperature and pressure of the alcohol. At or above the critical point of the alcohol, distinct liquid and gas phases do not exist, and the phase-boundary between liquid and gas is terminated. Different alcohols have distinct critical temperatures and pressures. For example, methanol is supercritical at or above a temperature of approximately 240° C. and pressure of approximately 1173 psig (81.9 bar), or equivalents. Ethanol is supercritical at or above a temperature of approximately 241° C. and pressure of approximately 890 psig (61.4 bar), or equivalents.

In alternative embodiments, the alcohol used in second stage of the reaction, i.e. the esterification stage, contains between 1 and 5 carbons, or 1, 2, 3, 4, 5 or 6 or more carbons, e.g. methanol, ethanol, propanol, butanol, isobutanol, isopropyl alcohol or a combination thereof. In various other embodiments, conditions may be such that a higher alcohol containing more than 5 carbons are used. In alternative embodiments as provided herein, methanol is used as the alcohol; however, in other embodiments other alcohols can be used, and those skilled in the art would understand that other alcohols, e.g., a higher alcohol, can be used.

In alternative embodiments, "biodiesel" refers to a fuel product comprised primarily or substantially of fatty acid alkyl esters derived from the esterification and/or transesterification of a natural oil feedstock with an alcohol. The composition of the fatty acid alkyl esters generated in the disclosed process will depend on the alcohol used in the esterification/transesterification reaction of the second stage of the process. For example, if methanol is the alcohol used in the second stage of the process, the fatty acid alkyl esters will be fatty acid methyl esters (FAME) and the process will generate a biodiesel product comprising FAME. If ethanol is the alcohol used in the reaction, the fatty acid alkyl esters will be fatty acid ethyl esters (FAEE) and the process will generate a biodiesel product comprising FAEE. Various specification and standards have been established to characterize biodiesel fuels and blend stocks for example, the American Society of Testing and Manufacturing (ASTM) D6751-14 "Standard Specification for Biodiesel Fuel Blend Stock (B100) for Middle Distillate Fuels" which is incorporated herein in its entirety. In alternative embodiments, the biodiesel generated in the disclosed process meets or exceeds those specifications established by ASTM D6751-14.

In alternative embodiments, "USP-Grade glycerol" or "food-grade glycerol" is a glycerol product meeting or exceeding the standards set forth by the U.S. Pharmacopeial Convention (USP) for classification as a "USP-grade" glycerol. In alternative embodiments, the systems and methods as provided herein result in the production of USP-grade glycerol as a co-product to the production of biodiesel.

In alternative embodiments, a "co-solvent" is a product or compound that increases the solvolysis activity of the reaction mixture, thereby enabling a more complete conversion and/or a faster reaction of lipids to biodiesel, and in some embodiments increasing the overall yields of the process. In alternative embodiments, processes and methods as provided herein comprise the addition of a co-solvent to the reaction mixture (the mixture of the alcohol and the feedstock). The co-solvent can be, for example, a hydrocarbon or hydrocarbon mixture, or a carbon dioxide ($CO_2$). In alternative embodiments provided herein, $CO_2$ is the co-solvent used, however, in other embodiments other co-solvents can be used, and those skilled in the art will appreciate that other co-solvents may be substituted in alternative embodiments.

In alternative embodiments, the method or process as provided herein is a two-stage method or process comprising a first hydrolysis stage and a second esterification stage. In alternative embodiments, in the first stage of the 2-stage process, a natural oil feedstock is mixed with water and transferred to a reaction vessel, or the feedstock and water are transferred to the reaction vessel separately and mixed therein. In alternative embodiments, the reaction vessel comprising the water and feedstock is then heated and pressurized to allow for the water to reach a, for example, "subcritical" or "superheated" state. A "subcritical" or "superheated" water is a water that has been heated to a temperature of above the boiling point of water at atmospheric presser (14.7 psig) (2.03 bar), or about 100° C. and pressurized such that the pressure is sufficient to prevent the water from boiling or sufficient to maintain the water in a liquid state. In alternative embodiments of the first hydrolysis stage of the process, esters, e.g. glycerides (mono-, di-, and tri-glycerides), are hydrolyzed to generate glycerol and free fatty acids. In alternative embodiments of the hydrolysis reaction, triglycerides are hydrolyzed to generate 1 molecule of glycerol and 3 molecules of free fatty acids; di-glycerides are hydrolyzed to generate 1 molecule of glycerol and 2 molecules of free fatty acids; mono-glycerides are hydrolyzed to generate 1 molecule of glycerol and 1 free fatty acid molecule.

Hydrolysis Reaction

In alternative embodiments, as an exemplary optional step, prior to the hydrolysis reaction, the feedstock is first mixed with water, e.g. tap water or deionized water in a molar ratio of between about 1:1 to 3:1 to about 100:1 water-to-oil, e.g. between about 10:1 to about 90:1, about 20:1 to about 80:1, about 30:1 to about 70:1, about 35:1 to about 60:1, about 40:1 to about 50:1, or about 40:1 water-to-oil. Optionally, the water and feedstock can be mixed via mechanical sheer, ultrasonication or equivalents or other suitable technique known in the art to form an emulsion or equivalent. In alternative embodiments, the water/feedstock mixture is then pumped or otherwise transferred into a reaction vessel, e.g. a plug-flow, continuously stirred tank (CSTR), or other suitable reactor. In alternative embodiments, the water/feedstock mixture is pumped into the reaction vessel via a positive displacement pump comprising a backpressure regulator valve operationally connected to the reaction vessel. In such embodiments, the hydraulic force generated by compacting the fluid water/feedstock mixture against a back pressure regulator valve of the pump can generate pressures of between about 0 to 500 or 10 to 300 to about 5000 psig (e.g., 1.01 bar to 355 bar) in the reaction vessel. In alternative embodiments, the pressurized water/feedstock mixture passes through the discharge mechanism and into the reaction vessel wherein the generated pressure is maintained for the duration of the hydrolysis reaction. In alternative embodiments, the vessel is maintained at a pressure of about 2000 psig (139 bar).

In alternative embodiments, a co-solvent is added to the water/feedstock reaction mixture in the first stage of the process. The co-solvent can be mixed at the same time that the water and feedstock are mixed, or the co-solvent can be added to the pressurized water/feedstock mixture in the reaction vessel via a port, for example a port following the discharge mechanism of the pump. The co-solvent can be, for example, an organic acid, e.g. carbonic acid, a hydrocarbon, e.g. methane, ethane, propane, butane, or pentane, or any combination thereof. The amount of the co-solvent in the reaction mixture (along with the water and feedstock), can be in the amount of between about 0.01:1 to 10:1 co-solvent-to-water, e.g. between about 0.05:1 to about 8:1, about 0.1:1 to about 6:1, about 0.15:1 to about 4:1, or about 0.2:1 to about 2:1, or about 0.2:1 co-solvent-to-water.

In alternative embodiments, the reaction vessel comprising the hydrolysis reaction mixture, comprising water, feedstock and, optionally the co-solvent, is the heated to a temperature of between about 20° C. to 150° C. to about 400° C. to 500° C., or 450° C., e.g. between about 200° C. to about 400° C., about 250° C. to about 350° C., or about 300° C. In one embodiment, the pressure in the reaction vessel is maintained at about 2000 psig (139 bar) and heated to a temperature of about 300° C., thereby causing the water in the hydrolysis reaction mixture to become a "hot compressed liquid", i.e. a liquid that has been heated to above its atmospheric boiling point (the point at which the liquid boils at atmospheric pressure) and pressurized such that the pressure exceeds the vapor pressure of the liquid thereby causing it to remain in a liquid state.

In alternative embodiments, the contents of the reaction vessel are allowed to react at the selected temperature and pressure for a period of between about 1 second (sec) to about 72 hours, or between about 1 to about 300 minutes, e.g., between about 2 to about 250 minutes, about 4 to about 200 minutes, about 6 to about 150 minutes, about 8 to about 100 minutes, about 10 to about 90 minutes, about 12 to about 70 minutes, about 14 to about 50 minutes, about 16 to about 40 minutes, about 18 minutes to about 30 minutes, or about 20 minutes, or until substantially all, or most (e.g., 70% or more of the ester bonds, e.g. 75%, 80%, 90%, 95%, 97%, 98%, 99% or more) of the ester bonds in the feedstock have been hydrolyzed, thereby "cleaving" or separating, via hydrolysis acting at the ester bonds of the esters in the feedstock, fatty acid molecules to generate "free" (un-esterified) fatty acids.

In alternative embodiments, after the hydrolysis reaction mixture (feedstock, water, and optionally a co-solvent) has been reacted for the desired period of time (e.g., after substantially hydrolyzing all fatty acid molecules to generate "free" (un-esterified) fatty acids), the resulting "hydrolysis product mixture" will vary depending on the composition of the feedstock, but may comprise, for example, free fatty acids, glycerol, water, unsaponifiable material (e.g. waxes, sterols and hydrocarbons if present in the feedstock), and glycerol phosphatidyls (resulting from the cleaving of the free fatty acids from phospholipids if phospholipids are present in the feedstock), as well as any unreacted (un-hydrolyzed) esters e.g. glycerides, and phospholipids.

In alternative embodiments, heat recovery is performed before and/or during and/or after the hydrolysis reaction. In alternative embodiments, a heat recovery operation is included in the process wherein, following the hydrolysis reaction, incoming hydrolysis reaction mixture material (feedstock, water and optionally a co-solvent) is heated with the heat contained in the hydrolysis product mixture using a heat-exchanger device, e.g. a shell-and-tube heat exchanger or other suitable heat recovery system. In alternative embodiments, a shell-and-tube heat exchanger is utilized and comprises an outer cylindrical tube or "shell" having an exterior wall and an interior wall defining an internal cavity within which one or more tubes are contained, each having a smaller diameter than the outer tube, and each having an exterior wall and an interior wall defining an internal cavity.

In an exemplary embodiment, a shell-and-tube heat exchanger is utilized in the process and the heated material (the hydrolysis product mixture), flows within the "tube" portion (within the interior cavity of the tubes contained within the shell) of the shell-and-tube heat exchanger and the incoming process material, having just exited the discharge of the high-pressure pump and therefore pressurized to the desired pressure of the hydrolysis reaction, flows counter-currently within the "shell" of the shell-and-tube heat exchanger, (between the exterior walls of the tubes contained within the shell and the interior wall of the shell). Heat is thereby transferred and simultaneously heats the incoming reaction mixture and cools the hydrolysis product mixture.

The temperature of the hydrolysis product mixture can be decreased from the temperature of the hydrolysis reaction by, for example, between about 70° C. and about 370° C., depending on the temperature of the hydrolysis reaction and the desired temperature of the product mixture in subsequent unit operations. In certain embodiments, the temperature of the reaction vessel is maintained at a temperature of about 200° C. during the hydrolysis reaction and the hydrolysis product mixture is cooled to a temperature of about 120° C. in the foregoing eat exchange step, a reduction in temperature of about 80° C. In other embodiments, the hydrolysis reaction is conducted at higher or lower temperatures and the hydrolysis reaction products are cooled to higher or lower temperatures than about 120° C. in the heat exchange step.

In alternative embodiments, following the heat-exchange, the pressure of the cooled hydrolysis product mixture is reduced by, for example, passing the reaction products through a backpressure regulator device or equivalent that decreases the pressure of the product mixture to about atmospheric pressure (for example, to about 0 psig or 1.01 bar, or between about 0 psig and 14.7 psig, or 2.03 bar). In alternative embodiments, the pressure of the hydrolysis reaction products is decreased rapidly and a portion of the water in the product mixture "flashes" off, i.e. vaporizes, as the pressure exerted on the reaction products is reduced to below the vapor pressure of the cooled mixture. Any suitable vessel known in the art may be used for this step and is therefore not limited by a specific apparatus or device. The flashed water can be captured and recycled in the process for subsequent hydrolysis reactions.

In alternative embodiments, the hydrolysis product mixture, following the optional flash step above, is further cooled to a temperature of between about 70° C. and about 110° C., e.g. between about 80° C. and about 105° C., between about 90° C. and about 100° C., or about 90° C. This cooling step is optionally achieved via the use of a heat exchanger, thereby allowing for the recovery of heat, which can be recycled for use elsewhere in the process.

In alternative embodiments, the product mixture is then transferred to an "oil/water separation unit", e.g. a centrifuge, decanter, hydrocyclone (or series of hydrocyclones), or other suitable apparatus or system wherein the product mixture is separated into a lipid phase and an aqueous phase, and the lipid and aqueous phases are physically separated from one another thereby generating two separate streams for further processing. In alternative embodiments, the lipid phase comprises the free fatty acids and possibly other lipids (if all of the ester bonds in the feedstock was not completely hydrolyzed) e.g. glycerides and phospholipids, and an aqueous phase comprising water and glycerol and, if phospholipids were present in the feedstock, glycerol phosphatidyls. In alternative embodiments, the lipid phase floats on top of the aqueous phase due to the differences in density of the products within each phase and the lipid phase is removed from the aqueous phase.

In alternative embodiments, the separated lipid phase is subjected to an optional "drying" step wherein any water that was entrained in the lipid during the lipid phase separation step is removed from the remaining lipid products (e.g. free fatty acids and glycerides), thereby generating a lipid product substantially free of water. In alternative embodiments, the drying is achieved by heating the lipid phase to a temperature of between about 40° C. and about 200° C., e.g. between about 100° C. and about 195° C., about 120° C. and about 190° C., about 140° C. and about 185° C., or about 185° C. under a vacuum of between about 5 to about 770 Torr absolute, e.g. between about 10 and about 600 Torr absolute, between about 15 and about 500 Torr absolute, between about 20 and about 400 Torr absolute, between about 30 and about 300 Torr absolute, between about 35 and 200 Torr absolute, between about 40 and about 100 Torr absolute, between about 45 and about 80 Torr absolute, between about 50 and about 60 Torr absolute, or about 55 Torr absolute. In alternative embodiments, the drying step can be conducted at atmospheric pressure or positive pressure. The water that has been removed from the lipid phase can optionally be recycled in the process.

In alternative embodiments, the aqueous phase generated in the lipid separation step is transferred to a distillation column, stripping column, or other suitable separation column or device, wherein the glycerol is separated from the remaining products in the aqueous phase. The configuration of the column (e.g. the stripping column or distillation column) can vary depending on the desired product output and composition of the aqueous phase that is the input stream to the column. In alternative embodiments, the distillation column is a packed distillation column. In other embodiments, the distillation column is a trayed distillation column comprising between 1 and 50 stages, e.g. between 2 and 40 stages, between 3 and 30 stages, between 4 and 20 stages, between 5 and 10 stages, or 6 stages.

In alternative embodiments, the aqueous phase is transferred to a glycerol distillation column, e.g. a 6-stage distillation column, in which the aqueous stream is introduced into the column and is heated such that a vapor phase, comprising primarily water, or water and alcohol (if the input to the glycerol distillation unit includes the glycerol-containing aqueous phase generated in the second stage of the process), is generated and rises to the top of the column where it is removed. In this exemplary embodiment, the column "bottoms" are a primarily a glycerol product in the range about 85 to about 99.9 wt % glycerol, e.g. about 99.5% glycerol, which can be marketed directly as "splitter crude" grade glycerol or upgraded through techniques known in the art to a USP grade tech glycerol. The aqueous phase is distilled under a vacuum of between about 10 and 770 Torr absolute, e.g. between about 50 and about 500 Torr absolute, about 100 and about 400 Torr absolute, about 200 and about 300 Torr absolute, or about 250 Torr absolute. The distillate stream generated in the distillation column is deionized water, which can be recycled in the process for use in subsequent hydrolysis reactions. In alternative embodiments, the water is removed at atmospheric or positive pressure.

Exemplary Esterification/Transesterification Reactions

In alternative embodiments, the lipid phase generated in the foregoing lipid separation step following the hydrolysis reaction and comprising free fatty acids (FFAs), and possibly esters e.g. glycerides and/or phospholipids referred to herein as the "esterification feedstock" is combined with an alcohol, e.g. methanol or ethanol, that is essentially free of any contaminants, e.g. about 99.0% alcohol, to form a reaction mixture. In certain embodiments, an at least one alcohol with lower purity may be used, e.g. an alcohol comprising about 95% alcohol and 5% water, or an alcohol comprising about 90% alcohol and 10% water. Lower-purity alcohols are generally cheaper than high-purity alcohols and their use may therefore result in more favorable economics despite lower FFA yields from the process. The lipid phase generated in the first stage of the process is therefore the feedstock for the second stage of the process. The molar ratio of the at least one alcohol to the esterification feedstock in the reaction mixture can be between about 1:1 to 5:1 and about 50:1 to 70:1, e.g., at about 40:1. In alternative embodiments, the moisture content (amount of water) of the esterification feedstock, is between about 0 and 5% by weight of the feedstock. Once the esterification feedstock, and alcohol are combined, they are optionally mixed, e.g. via mechanical sheer and or sonication mixing, to form an emulsion or equivalent. The esterification/transesterification feedstock and alcohol can be mixed for between about 5 to about 180 minutes, e.g. about 60 minutes or an emulsion is formed. If sonication is selected as the method of mixing, the frequency range can be between about 20-100 kHz, e.g. about 42 kHz. The combined and optionally emulsified esterification feedstock and alcohol mixture is referred to herein as the "esterification reaction mixture."

In alternative embodiments, the esterification/transesterification reaction mixture is then pumped into a reactor comprising a series of heat exchangers, e.g., concentric metal heat exchangers, via a positive displacement pump (or other suitable pump type) wherein the pressure created from pumping the mixture against a backpressure regulator valve on the reaction mixture is between about 500 to about 5000 psig (35.5 to 355 bar), e.g. about 2000 psig (139 bar), as measured at the discharge of the pump. Directly after the discharge of the high-pressure pump, a co-solvent, e.g. an organic acid or a hydrocarbon e.g. methane, ethane, propane, butane, or pentane or any combination thereof, may optionally be added to the esterification/transesterification reaction mixture via a port that is operationally connected to the discharge area of the pump. The amount of optional co-solvent-to-alcohol in the esterification reaction mixture can be, for example a molar ratio of between about 0.01:1 to about 5:1, e.g. about e.g. between about 0.05:1 to about 8:1, about 0.1:1 to about 6:1, about 0.15:1 to about 4:1, or about 0.2:1 to about 2:1, or about 0.2:1 co-solvent-to-alcohol.

In alternative embodiments, the pressurized esterification/transesterification reaction mixture, comprising the esterification feedstock, alcohol, and the optional co-solvent and/or FFAs are then heated in a suitable reaction vessel to a temperature in the range of between about 200° C. to about 400° C., e.g. 290° C., or a temperature about the critical temperature of the selected alcohol. In an exemplary embodiment, the alcohol in the esterification/transesterification reaction mixture is methanol and the temperature of the reaction is above the critical temperature of methanol, i.e., above about 240° C., e.g. about 300° C., and the pressure is above the critical pressure of the methanol, i.e. about 1173 psig (81.9 bar). The esterification/transesterification reaction mixture is maintained at the desired temperature and pressure and allowed to react for between about 1 minute to about 300 minutes, e.g. between about 5 minutes about 60 minutes, about 10 minutes and about 40 minutes, or about 15 minutes about 25 minutes, or about 20 minutes. During the reaction, the alcohol esterifies the free fatty acids to generate fatty acid alkyl esters, e.g. fatty acid methyl esters (FAME) if methanol is the alcohol used in the reaction. The alcohol undergoes a transesterification reaction with the esters (if present) in the reaction mixture to generate fatty acid alkyl esters. In alternative embodiments, substantially all of the FFAs (e.g., about 90%, 95%, 98%, 99% or 99.5% or more FFAs) present in the feedstock undergo an esterification reaction with the at least one alcohol to generate fatty acid alkyl esters and substantially all of the esters (e.g., about 90%, 95%, 98%, 99% or 99.5% or more of the esters) in the feedstock, e.g. glycerides, phospholipids or other esters, will similarly be subjected to transesterification to generate fatty acid alkyl esters.

If water is present in the esterification/transesterification reaction mixture, the water can allow for less severe reaction conditions, e.g. lower temperatures and pressures, by increasing the solvolysis activity of the mixture, relative to a mixture comprising alcohol and the esterification feedstock alone i.e. without water. The water can also react with a portion of the ester bonds present in the esterification/transesterification feedstock, thereby hydrolyzing a portion of the esters to generate free fatty acids. The hydrolysis of esters by water can allow for increased free fatty acid yield from the esterification reaction with decreased reaction times. In alternative embodiments, during the second stage of the process, the esterification reaction allows for the simultaneous hydrolysis and esterification of esters in the esterification feedstock. As an example, a triglyceride in the esterification/transesterification feedstock may be subjected to hydrolysis with water to generate one molecule of glycerol and 3 molecules of free fatty acids. In the same reaction step, the generated 3 free fatty acids molecules can undergo an esterification reaction with the alcohol in the esterification reaction mixture to generate three molecules of fatty acid alkyl esters.

In alternative embodiments, the product mixture generated by the esterification/transesterification reaction, referred to herein as the "esterification/transesterification reaction product," can comprise fatty acid alkyl esters, water, unreacted alcohol, glycerol, co-solvent (if present in the reaction mixture) and possibly other products, e.g. glycerol phosphatidyls, which can be phospholipids are present in the feedstock. In alternative embodiments, the esterification/transesterification reaction product may also comprise saponifiables that did not undergo a hydrolysis or transesterification reaction and therefore remain "unreacted" (unreacted saponifiables). The portion of unreacted saponifiables after the esterification/transesterification reaction can be between about 0% to about 50% of the saponifiables that were present in the natural oil and/or mixed lipid feedstock, e.g. between about 1% and 15%, about 2% and 10% or about 2% of the saponifiables that were present in the natural oil and/or mixed lipid feedstock.

The esterification/transesterification reaction product may also comprise free fatty acids (FFAs) that did not react with the alcohol to generate fatty acid alkyl esters and therefore remain "unreacted." The portion of unreacted free fatty acids after the esterification/transesterification reaction can be between about 0% to about 50% of the free fatty acids that were present in the natural oil and/or mixed lipid feedstock, e.g. between about 1 and 15%, about 2 and 10% or about 3% of the free fatty acids that were present in the natural oil and/or mixed lipid feedstock.

In alternative embodiments, following the reaction, the esterification/transesterification reaction product (e.g., the product mixture in which the fatty acids generated in the first hydrolysis stage of the process are substantially esterified and the esters that were not hydrolyzed in the first hydrolysis stage of the process are substantially transesterified) is discharged from the reactor, e.g., via a high-pressure pump, and passed through a heat exchanger, e.g., a high pressure concentric heat exchanger (wherein the pressure can be maintained by the backpressure regulator), and wherein the heat is withdrawn from the product mixture and optionally recovered, for example, where the heat is recycled for use elsewhere in the process, e.g. to heat the reactor, thereby decreasing the overall energy requirements of the system. In alternative embodiments, the mixture then passes through a backpressure regulator device at a temperature of between about 125° C. to about 350° C., or between about 150° C. to about 300° C., e.g. about 240° C.

In alternative embodiments, following the heat recovery step, the esterification/transesterification reaction product is optionally subjected to a flash separation process wherein the pressure of the cooled esterification/transesterification reaction product is reduced by, for example, passing the product mixture through a backpressure regulator device and into a flash drum or other appropriate or equivalent vessel wherein the pressure of the product mixture is reduced from the pressure within the heat exchanger (e.g., above about 1173 psig or about 2000 psig, or 81.9 bar to 139 bar) to about atmospheric pressure (e.g., to about 0 psig or 1.01 bar, or to between about 0 psig and about 14.7 psig, or 2.03 bar). In alternative embodiments, the pressure of the esterification/transesterification reaction product is decreased rapidly and the decrease in pressure. The decrease in pressure results in an environment in which the vapor pressure of the alcohol exceeds its external pressure (the pressure of the flash drum or vessel), allowing for the alcohol, co-solvent (if present) and any water (collectively referred to as "the solvent" in this and subsequent steps) to vaporize or "flash" out of the product mixture.

In alternative embodiments, the optional flash step causes approximately 95% of the solvent present in the product mixture to vaporize and leave the flash vessel, with approximately 5% of the solvent remaining in a liquid state and exiting the bottom of the flash unit along with the remaining products in the product mixture, referred to herein as the "crude fatty acid alkyl ester". In such embodiments, the concentration of solvent (i.e. alcohol/and optionally water and/or the co-solvent) leaving the flash unit in a liquid state (in the ester stream) is approximately 2 wt. % of the crude fatty acid alkyl ester.

In alternative embodiments, the crude fatty acid alkyl ester (e.g., comprising fatty acid alkyl esters such as fatty acid methyl esters (FAME) and glycerol, any unreacted saponifiables, inert unsaponifiables, as well as the water and alcohol that was not separated in the previous flash step) leaves the flash unit at a temperature in the range of between about 110 to about 125° C., e.g., 115° C., and is optionally sent to a heat exchanger, e.g., a standard shell and tube heat exchanger, wherein it is cooled, e.g., cooled to about 95° C. The recovered heat can be recycled for use in the process, e.g. to heat the esterification/transesterification reactor.

In alternative embodiments, the solvent mixture (e.g., the alcohol/water/and, if present, co-solvent mixture obtained from the previous flash separation step), wherein the solvent mixture can be approximately about 95 wt % alcohol or about 95 wt % alcohol/co-solvent (if co-solvent is present) and approximately 5 wt % water, is then distilled to yield a substantially pure alcohol product, e.g., a substantially pure methanol product, e.g. approximately 99.8% or more alcohol. The distillation unit can comprise, for example, a packed or trayed distillation columns, e.g., a trayed distillation column comprising between 1 and 75 stages, e.g. between 5 and 70 stages, between 10 and 65 stages, between 15 and 60 stages, between 20 and 55 stages, between 25 and 50 stages, or between 30 and 45 stages, e.g. 40 stages. The distillation can be achieved under a vacuum, but the distillation can also comprise conditions of at atmospheric and/or positive pressure of to generate a substantially pure alcohol product. The generated substantially pure alcohol product can be recycled to the alcohol supply tank for use in subsequent reactions. If present, the co-solvent is distilled in the same distillation step to yield a substantially pure co-solvent product, e.g. 99.8% pure co-solvent. The substantially pure co-solvent can be recycled for use in subsequent reactions.

In alternative embodiments, after the crude fatty acid alkyl ester is cooled via a heat exchanger, it is transferred (e.g., via a pipe) wherein it is mixed with water via, for example, an inline static mixer or wherein it is mixed with water in a ratio of between 1:1 to 50:1 ester stream-to-water by mass. The water and crude fatty acid alkyl ester stream mixture is then transferred to a suitable separation vessel, e.g., a decanter, a centrifuge, or a hydrocyclone or series of hydrocyclones, wherein a lipid stream, referred to herein as the "crude biodiesel stream" and an aqueous phase are formed and are separated.

In alternative embodiments, the aqueous stream that leaves the decanter comprises alcohol, water (including any water that was not removed in the flash separation step and water introduced in the present glycerol recovery/water-wash step) and glycerol, is then transferred to a glycerol stripping column, e.g. a 6-stage stripping column, in which the aqueous stream is introduced to the top of the column and, upon contacting the bottom of the column is heated such that a vapor phase, comprising primarily alcohol and water, is generated and rises to the top of the column where it is removed. In this exemplary embodiment, the column "bottoms" are a primarily a glycerol product in the range if between about 70 to 80 and about 99.9 wt % glycerol, e.g. about 99.5% glycerol, which can be marketed directly as "splitter crude" grade glycerol or upgraded through techniques known in the art to a USP grade tech glycerol. The generated glycerol product can optionally be mixed with the glycerol product generated during the first hydrolysis stage of the process. In alternative embodiments, the aqueous stream generated in the first (hydrolysis) stage of the process comprising glycerol is combined with the aqueous stream generated in the second (esterification) stage of the process and are distilled simultaneously to generate the glycerol product.

In alternative embodiments, the crude biodiesel stream separated from the decanter is then heated to between about 150° C. to about 220° C. via a shell-and-tube heat exchanger and is allowed to flash at an absolute pressure in the range of between about 0 psig (1.013 bar) to about 10 psig (1.7 bar), e.g. 1 psig (1.08 bar), or between about 5 and 770 torr, e.g. 10 torr to about 300 torr, between 20 and 150 torr, between 30 and 100 torr, between 40 and 80 torr, or about 55 torr. In this flash step, substantially any excess water contained in the crude biodiesel stream from the decanting step is removed, thereby "drying" the crude biodiesel fraction in order to meet the water content specifications for ASTM B100 biodiesel, if methanol is the alcohol used in the esterification/transesterification reaction. In alternative embodiments, a portion of the fatty acid alkyl esters (e.g., less than about 5%) in the flash process stream is evaporated with the water in the flash/dryer unit. This material can be condensed in a shell-and-tube condenser and can be routed back to the process fluid while the temperature is regulated below the methanol/water vapor dew point. In so doing, it remains as a vapor and is routed out of the system.

In alternative embodiments, the "bottoms" of this flash/drying unit are then sent to a distillation column wherein the fatty acid alkyl esters are separated from the other products present in the bottoms, e.g. waxes, unreacted lipids e.g. glycerides, FFAs, tocopherols, or sterols, or the like to yield a distillate stream comprising substantially pure e.g. 98% or more, fatty acid alkyl esters. In alternative embodiments, the distillation column can be, for example a packed distillation column or a trayed distillation column. In alternative embodiments, the distillation column comprises between 1 and 50 stages, e.g. between 5 and 45 stages, between 10 and 40 stages, between 15 and 35 stages, between 20 and 30 stages, or 25 stages. In alternative embodiments, the distillation is conducted under a vacuum in the range of between about 0.1 and 200 Torr absolute, e.g. between about 2 and 150, between 4 and 100, between 6 and 50, between 8 and 20, or about 10 Torr absolute. In alternative embodiments, where methanol is the alcohol used in the esterification/transesterification reaction, the distillate stream comprises substantially pure fatty acid methyl ester (FAME) meeting or exceeding the standards established for ASTM B100-grade biodiesel. In alternative embodiments, if the distillate does not meet the B100 specification if can be chemically neutralized to effectively reduce the acid value to meet the B100 specification. In alternative embodiments, the "bottoms" of the distillation column in the present step are then sent back to the beginning of the process to be combined with the corn oil feedstock for use in subsequent reactions. In alternative embodiments, at least a portion of the bottoms material is sent to one or more additional separation steps to valorize one or multiple components in the stream.

In alternative embodiments, the "bottoms" of the distillation column in the previous fatty acid alkyl ester distillation step can comprise, for example, unreacted esters, e.g. glycerides any combination of mono-glycerides, di-glycerides, and triglycerides), sterols, tocopherols, and various unsaponifiable material e.g. waxes and hydrocarbons. In alternative embodiments, the at least a portion of the bottoms are sent back to the beginning of the process to be combined with the starting feedstock for use in subsequent reactions.

Separation of Fatty Acid Esters from Saponifiable Matter and/or Unsaponifiables

In alternative embodiments, some or all fatty acid alkyl esters are separated from saponifiables and/or unsaponifiables to create a "first fatty acid alkyl ester" and a "first residual lipid phase". Any method and/or process known in the art may be used to effect this separation. Some examples of separation methods include, but are not limited to: distillation, chromatography, ion exchange, crystallization, liquid-liquid extraction, and the like. Once fatty acid alkyl esters are removed, the remaining saponifiables and/or unsaponifiables in the first residual lipid phase are optionally recycled back to the system for alcoholysis and/or purged from the system so as to prevent undesirable buildup of non-fatty acid alkyl ester material. There is no limitation on the ratio of recycled first residual lipid phase stream to purged first residual lipid phase stream.

In alternative embodiments, the first fatty acid alkyl ester generated meets commercial biodiesel specifications that allow for its sale in the market.

In alternative embodiments, the first fatty acid alkyl ester generated does not meet commercial biodiesel specifications. Any number of additional upgrading techniques may be used to generate a material that does meet commercial biodiesel specifications that allow for its sale in the market.

In alternative embodiments, the saponifiables and/or unsaponifiables in the first residual lipid phase remaining after some or all fatty acid alkyl esters are separated can comprise a range of unreacted glycerides (for example, between about 0% and 15%, or 0.5%, 1%, 2%, 3%, 4%, 5%, 10% or 20% or more, of unreacted glycerides), and, for example, the unreacted glycerides can comprise glycerides that were not transesterified to generate fatty acids esters, e.g., wherein the amount of glycerides that were not transesterified to generate fatty acid esters comprise between about 0 wt % and 100 wt %, or between about 0.5 wt % and 70 wt %, or between about 1 wt % and 60 wt %, or between about 5 wt % and 50 wt %, or between about 10 wt % and 40 wt %, or about 10, 15, 20, 25, 30, 35, 40, 45 or more wt % of the saponifiables.

In alternative embodiments, color and/or odor bodies are removed at any point in the process; removal of color and/or odor bodies can be for (or result in) increasing the purity of the fatty acid esters. In alternative embodiments, color and/or odor bodies are removed in the 'lights' cut of a dryer or a distillation unit, but any other means of removal may be utilized in lieu of or in addition to the dryer or distillation unit, or any equivalent process units. In alternative embodiments, substantially all of the color and odor bodies are removed, e.g., 75%, 80%, 85%, 90%, 95%, 98%, 99% or of the color and/or odor bodies are removed.

Valorization of Compounds Remaining after Removal of a First Fatty Acid Alkyl Ester:

In order to maximize the overall value from the lipid phase or lipid component separation process, in alternative embodiments the process comprises any number of additional upgrading steps, by any approaches desired, wherein the first residual lipid phase comprising the remainder of saponifiables and/or unsaponfiables, e.g., fatty acid alkyl esters, unreacted glycerides/squalene/oryzanol/waxes, is/are further valorized (or recycled) into higher value components. Streams created from these upgrading steps may be recycled to the system and/or purged from the system.

In alternative embodiments, a distillation column, a flash vessel, a wiped film evaporator, or any equivalent apparatus, to effect (cause the) the separation of "2nd fatty acid alkyl esters" from (substantially) the rest of the components in the first residual lipid phase so as to create a "$2^{nd}$ residual lipid phase". In alternative embodiments, the addition of the distillation step removes a majority of (e.g., substantially most of), e.g., between about 70%, and 100%, or removes about 75%, 80%, 85%, 90%, 95%, 98%, 99% or more, of the 2nd fatty acid alkyl esters to create a $2^{nd}$ residual lipid phase, e.g. a still pitch residue (bottoms stream from a distillation unit). In alternative embodiments, alcohol and/or water in the lipid phase is/are removed (e.g., substantially removed, e.g., 85%, 90%, 95%, 98%, 99% or more alcohol and/or water in the lipid phase is removed) prior to entering the distillation unit; for example, all of the at least one alcohol and/or water or substantially all of the at least alcohol and/or water (e.g., about 90%, 95%, 98%, 99% or 99.5% or more alcohol and/or water) may be removed. Any apparatus or protocol can be used to accomplish removal of alcohol and/or water. In alternative embodiments, the alcohol and/or water in the lipid phase may be removed inside of the same evaporative unit that removes fatty acid esters; for example, the separation of fatty acid esters from (substantially) the rest of the components in the lipid phase can be done in an evaporator, or any equivalent apparatus, and all or substantially most of the alcohol and/or water can be removed inside of this same evaporator or equivalent apparatus.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12% 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

The invention will be further described with reference to the following examples; however, it is to be understood that the exemplary embodiments provided herein are or the invention are not limited to such examples.

EXAMPLES

Example 1: Exemplary Corn Stillage Oil Reaction

In this exemplary embodiment, the lipid feedstock is first combined with deionized water. The molar ratio of water to the oil is 40:1. After combination, an emulsion is formed via mechanical sheer. The solution is then pumped into a Plug Flow Reactor via a positive displacement pump up to a pressure of 2000 psig (139 bar) (created hydraulically by compacting the fluid against a Back Pressure Regulator Valve). The contents are then heated to a temperature of 285 degrees (deg) C for 20 minutes. After reaction, the incoming process material that has just left the discharge of the high-pressure pump cools the already reacted solution to 95 deg C. (still under approximately 2000 psig) (or 139 bar); this is done for heat recovery purposes. The solution then passes through a back-pressure regulator device that decreases the pressure to near one atmosphere.

After the pressure has been relieved, the liquid FFA/oil/water solution is sent to a decanter where the FFA/oil phase is separated from the heavier water/glycerol phase. The FFA/oil mixture will then be heated to a temperature of 180 deg C., and subjected to a vacuum of 55 Torr to dry any residual water off of the material. The water/glycerol phase will be sent to a packed stripping distillation column with 6 stages at atmospheric pressure producing a deionized water distillate stream which is recycled to the hydrolysis reaction to be combined with fresh lipid feedstock. The bottoms stream of the water stripper will be a splitter crude glycerol product that can be upgraded to USP with another additional distillation column.

The FFA/oil mixture is then blended with dry methanol. The mixture is emulsified via mechanical sheer and pumped into a Plug Flow Reactor via another positive displacement pump up to pressure of 2000 psig (or 139 bar) (created hydraulically by compacting the fluid against a Back Pressure Regulator Valve). The contents are then heated to a temperature of 285 deg C. for 30 minutes. After reaction, there is another heat recovery section which cools the post-reaction fluid from the reaction temperature of 285 deg C. to 215 deg C., a large amount of heat is left on the stream to ensure near complete evaporation of the unreacted methanol solvent. After the heat recovery section, the Back Pressure Regulator Valve reduces the system pressure to one atmosphere. The alcohol/water/co-solvent vapors generated during the pressure decrease are routed to an alcohol distillation column with 30 theoretical stages at atmosphere where a 99.5% or greater purity methanol stream is separated and recycled back to the process. The bottoms of the methanol column are low enough in methanol concentration (less than 200 PPM) so that normal discharge is acceptable for disposal.

After the methanol flash, the liquid Fatty Acid Methyl Ester (FAME) solution is further cooled to a temperature of 95 deg C. via a shell and tube heat exchanger, this is done so that water may be added to the stream. Deionized water is then added to the process fluid at an approximate mass ratio of 1 g water:1 g glycerol. The soft water and FAME is mixed slightly via an inline static mixer and sent to a decanter where the FAME and aqueous phases are allowed to separate. The aqueous phase is sent to a water/methanol stripper, where all of the residual alcohol (or substantially all or the residual alcohol, e.g., about 90%, 95%, 98%, 99% or 99.5% or more of the residual alcohol) is separated from the water/glycerol phase. The stripped water/methanol vapor is left uncondensed and sent back to the methanol distillation column for purification. The water/glycerol bottoms from the stripping column is combined with the feed of the distillation column that produces a splitter crude glycerol after the hydrolysis step. The FAME phase from the decanter is then heated to 180 deg C., and allowed to flash at an absolute pressure of 55 Torr, this is to remove any trace amounts of solvent. The vapor removed with this evaporator is passed through a partial shell and tube condenser to capture and return any FAME that flashed along with the solvent, this material is recycled back to the feed of the evaporator. The uncondensed vapor leaving the partial shell and tube condenser has such a low amount of FAME that is condensed directly into cooling tower water via a liquid ring vacuum pump. The bottoms of the evaporator are then sent to a distillation column with 30 theoretical stages and a vacuum of 10 torr. The distillate stream of that distillation column will then be treated via chemical neutralization, centrifuged, and dried to reach a purity of B100 Biodiesel.

Example 2: Exemplary Palm Fatty Acid Distillate Reaction

In this exemplary embodiment, the first step of this process is a non-catalytic alcohol transesterification/esterification reaction. The reason a pretreatment hydrolysis step is not needed (compared to the first example of Corn Stillage Oil, CSO) is due to the relatively high Free Fatty Acid (FFA) content of the Palm Fatty Acid Distillate (PFAD) compared to the CSO. The FFA material inside the lipid feedstocks is a catalyst to the transesterification reaction, however it is also a reagent in the esterification reaction. The PFAD is blended with methanol at a molar ratio of 40:1. After combination, an emulsion is formed via mechanical sheer, which is applied via an inline rotor/stator mixer. The solution is then pumped into a Plug Flow Reactor via a positive displacement pump up to a pressure 2000 psig (or 139 bar) (measured at the discharge of the pump). The contents are then heated to a temperature of 285 deg C. for approximately 35 minutes. After reaction, a countercurrent concentric heat exchanger is used as an economizer to recover process heat. The post-reacted fluid is cooled from 285 deg C. to approximately 215 deg C. A large amount of heat is left on the stream in order to be used by the methanol for evaporation in a downstream flash unit. The 215 deg C. process fluid is then allowed to flow through a Back Pressure Regulator (BPR) which reduces the pressure to one atmosphere. The methanol/water vapors generated during the pressure decrease are then routed to a distillation column with 30 theoretical stages at atmospheric pressure where a 99.5% or greater purity methanol stream is separated and recycled back to the process. The bottoms of the methanol column are low enough in methanol concentration (less than 200 PPM) so that normal discharge is acceptable for disposal.

The bottoms of the methanol flash are then further cooled via a shell and tube heat exchanger to approximately 95 deg C. so that water may be used to wash the entrained glycerin out of the Fatty Acid Methyl Ester (FAME) Deionized water is then added to the process fluid at a mass ratio of 1 g water:1 g glycerol. The soft water and FAME solution is mixed slightly via an inline static mixer and sent to a decanter where the FAME and aqueous phases are allowed to separate. The aqueous phase is sent to a methanol/water stripper, where the residual solvent is evaporated off the water/glycerol and sent back to the methanol distillation column for purification. The water/glycerin material leaving the bottom of the stripper is classified as splitter crude glycerin, and can be further upgraded to USP glycerin with the use of another distillation column.

The FAME phase from the decanter is then heated via a heat exchanger to 180 deg C., and allowed to flash at 55 Torr this is to remove any trace amounts of solvent. The vapor removed with this evaporator is passed through a partial shell and tube condenser to capture and return any FAME that flashed along with the solvent, this material is recycled back to the feed of the evaporator. The uncondensed vapor leaving the partial shell and tube condenser has such a low amount of FAME that is condensed directly into cooling tower water via a liquid ring vacuum pump. The bottoms of the evaporator are then sent to a distillation column with 30 theoretical stages and a vacuum of 10 torr. The distillate stream of that distillation column will then be treated via chemical neutralization, centrifuged, and dried to reach a purity of B100 Biodiesel.

Example 3: Exemplary Crude Palm Oil Reaction

In this exemplary embodiment, the Crude Palm Oil (CPO) is first combined with deionized water. The molar ratio of water to the oil is 40:1. After combination, an emulsion is formed via mechanical sheer. The solution is then pumped into a Plug Flow Reactor via a positive displacement pump up to a pressure of 2000 psig (or 139 bar) (created hydraulically by compacting the fluid against a Back Pressure Regulator Valve). The contents are then heated to a temperature of 285 deg C. for 20 minutes. After reaction, the incoming process material that has just left the discharge of the high-pressure pump cools the already reacted solution to 95 deg C. (still under approximately 2000 psig, or 139 bar), this is done for heat recovery purposes. The solution then passes through a back-pressure regulator device that decreases the pressure to near one atmosphere.

After the pressure has been relieved, the liquid FFA/oil/water solution is sent to a decanter where the FFA/oil phase is separated from the heavier water/glycerol phase. The FFA/oil mixture will then be heated to a temperature of 180 deg C., and subjected to a vacuum of 55 Torr to dry any residual water off of the material. The water/glycerol phase will be sent to a packed stripping distillation column with 6 stages at atmospheric pressure producing a deionized water distillate stream which is recycled to the hydrolysis reaction to be combined with fresh lipid feedstock. The bottoms stream of the water stripper will be a splitter crude glycerol product that can be upgraded to USP with another additional distillation column.

The FFA/oil mixture is then blended with dry methanol. The mixture is emulsified via mechanical sheer and pumped into a Plug Flow Reactor via another positive displacement pump up to pressure of 2000 psig (139 bar) (created hydraulically by compacting the fluid against a Back Pressure Regulator Valve). The contents are then heated to a temperature of 285 deg C. for 30 minutes. After reaction, there is another heat recovery section which cools the post-reaction fluid from the reaction temperature of 285 deg C. to 215 deg C., a large amount of heat is left on the stream to ensure near complete evaporation of the unreacted methanol solvent. After the heat recovery section, the Back Pressure Regulator Valve reduces the system pressure to one atmosphere. The alcohol/water/co-solvent vapors generated during the pressure decrease are routed to an alcohol distillation column with 30 theoretical stages at atmosphere where a 99.5% or greater purity methanol stream is separated and recycled back to the process. The bottoms of the methanol column are low enough in methanol concentration (less than 200 PPM) so that normal discharge is acceptable for disposal.

The bottoms of the methanol flash are then further cooled via a shell and tube heat exchanger to approximately 95 deg C. so that water may be used to wash the entrained glycerin out of the Fatty Acid Methyl Ester (FAME). Deionized water is then added to the process fluid at a mass ratio of 1 g water:1 g glycerol. The soft water and FAME solution is mixed slightly via an inline static mixer and sent to a decanter where the FAME and aqueous phases are allowed to separate. The aqueous phase is sent to a methanol/water stripper, where the residual solvent is evaporated off the water/glycerol and sent back to the methanol distillation column for purification. The water/glycerin material leaving the bottom of the stripper is classified as splitter crude glycerin, and can be further upgraded to USP glycerin with the use of another distillation column.

The FAME phase from the decanter is then heated via a heat exchanger to 180 deg C., and allowed to flash at 55 Torr this is to remove any trace amounts of solvent. The vapor removed with this evaporator is passed through a partial shell and tube condenser to capture and return any FAME that flashed along with the solvent, this material is recycled back to the feed of the evaporator. The uncondensed vapor leaving the partial shell and tube condenser has such a low amount of FAME that is condensed directly into cooling tower water via a liquid ring vacuum pump. The bottoms of the evaporator are then sent to a distillation column with 30 theoretical stages and a vacuum of 10 torr. The distillate stream of that distillation column will then be treated via chemical neutralization, centrifuged, and dried to reach a purity of B100 Biodiesel.

Example 4: Exemplary Mass Balance of Corn Stillage Oil (CSO) Reaction

The following tables show the mass-balance of an exemplary embodiment of the 2-stage process. In the present example, corn stillage oil (CSO) is reacted in a first hydrolysis stage to generate an FFA-comprising lipid phase. The FFA-comprising lipid phase is then reacted in a second esterification stage wherein the FFA-comprising lipid phase from the first reaction was reacted with methanol at a temperature and pressure above the supercritical temperature and pressure of the alcohol. Mass-balance of the process is shown below (units for all numbers are Metric Tons):

| | Feed to reactor | Post hydrolysis reactor | Feed to decanter | Non-polar (aqueous) Phase of Decanter | Polar (lipid) phase of decanter | Distillate of water stripper | Bottoms of water stripper |
|---|---|---|---|---|---|---|---|
| Methanol | 82 | 77 | 77 | | | | |
| Water | 88 | 0 | | 0.5 | 76.5 | 75.2 | 1.3 |
| Triglycerides | | 2 | 2 | | | | |
| Diglycerides | | 5 | 5 | 2 | | | |
| Monoglycerides | | | | 5 | | | |
| Fatty Acid Methyl Ester | 10 | 90 | 90 | | | | |
| Free Fatty Acid | | 6 | 6 | 90 | | | |
| Glycerol | 2 | 2 | 2 | | 6 | | 6 |
| Unsaponifiables | 182 | 182 | 182 | 2 | | | |
| Total | 82 | 77 | 77 | 99.5 | 82.5 | 75.2 | 7.3 |

| | Feed to residual water flash | Vapor of Water flash | Bottoms of water flash | Feed to methanol reactor | Post-reaction methanol reactor |
|---|---|---|---|---|---|
| Methanol | | | | 66 | 56 |
| Water | 0.5 | 0.49 | 0.01 | 1 | 2.5 |
| Triglycerides | | | | | |
| Diglycerides | 2 | | 2 | 2 | 0.5 |
| Monoglycerides | 5 | | 5 | 5 | 2 |
| Fatty Acid Methyl Ester | | | | | 100.5 |
| Free Fatty Acid | 90 | | 90 | 90 | 2 |
| Glycerol | | | | | 0.5 |
| Unsaponifiables | 2 | | 2 | 2 | 2 |
| Total | 99.5 | 0.49 | 99.01 | 166 | 166 |

| | Vapor of methanol flash | Bottoms of methanol flash | Feed to decanter | Non-polar Phase of Decanter | Polar phase of decanter |
|---|---|---|---|---|---|
| Methanol | 54 | 2 | 2 | 0.5 | 1.5 |
| Water | 2.4 | 0.1 | 0.1 | 0.05 | 0.05 |
| Triglycerides | | | | | |
| Diglycerides | | 0.5 | 0.5 | 0.5 | |
| Monoglycerides | | 2 | 2 | 2 | |
| Fatty Acid Methyl Ester | | 100.5 | 100.5 | 100.5 | |
| Free Fatty Acid | | 2 | 2 | 2 | |
| Glycerol | | 0.5 | 0.5 | | 0.5 |
| Unsaponifiables | | 2 | 2 | 2 | |
| Total | 56.4 | 109.6 | 109.6 | 107.55 | 2.05 |

-continued

| | Vapor of residual solvent flash | Bottoms of residual solvent flash | Feed to fame column | Vapor of fame column |
|---|---|---|---|---|
| Methanol | 0.49 | 0.01 | 0.01 | 0.01 |
| Water | 0.04 | 0.01 | 0.01 | 0.01 |
| Triglycerides | | | | |
| Diglycerides | | 0.5 | 0.5 | |
| Monoglycerides | | 2 | 2 | |
| Fatty Acid Methyl Ester | | 100.5 | 100.5 | 100.4 |
| Free Fatty Acid | | 2 | 2 | 0.1 |
| Glycerol | | | | |
| Unsaponifiables | | 2 | 2 | |
| Total | 0.53 | 107.02 | 107.02 | 100.52 |

| | Feed to shortpath unit | Vapor (recycle to shortpath unit) | Bottoms of shortpath unit |
|---|---|---|---|
| Methanol | | | |
| Water | | | |
| Triglycerides | | | |
| Diglycerides | 0.5 | | 0.5 |
| Monoglycerides | 2 | 1.8 | 0.2 |
| Fatty Acid Methyl Ester | 0.1 | 0.1 | |
| Free Fatty Acid | 1.9 | 1.7 | 0.2 |
| Glycerol | | | |
| Unsaponifiables | 2 | | 2 |
| Total | 6.5 | 3.6 | 2.9 |

Example 5—First Pass (No Recycle Incorporated)

1000 g of beef tallow (AV 8.7) is combined with 300 g of methanol and reacted in a stirred autoclave at 315 C for 30 minutes. The reaction product mixture is transferred to a rotovap flask and methanol evaporated from the mixture at 150 C for 5 minutes at 1 atm. The flashed product mixture is cooled and combined with 10% water and decanted to remove water/glycerin. The washed/decanted product mixture is dried at between about 150° C. to about 300° C. for 30 minutes and 50 Torr absolute. The dried product mixture is subjected to distillation with 0.25" ProPak at 5 Torr to produce 790 grams (g) distilled FAME with AV of 0.6 and a residual lipid phase with total glyceride content of 84%. The distilled FAME is contacted with aqueous sodium hydroxide for 1 hour and centrifuged to remove sodium soaps. The treated FAME is dried at between about 150° C. to about 300° C. for 30 minutes at 50 Torr to yield a B100 FAME with AV of 0.1.

Example 6—Exemplary Methods Using Recycled Residual Lipid Phase 100 g of residual lipid phase from Example 5 is combined with 900 g beef tallow (AV 8.6) and 300 g methanol and reacted in a stirred autoclave at 315 C for 30 minutes. The reaction product mixture is transferred to a rotovap flask and methanol evaporated from the mixture at 150 C for 5 minutes at 1 atm. The flashed product mixture is cooled and combined with 10% water and decanted to remove water/glycerin. The washed/decanted product mixture is dried at between about 150° C. to about 300° C. for 30 minutes and 50 Torr absolute. The dried product mixture is subjected to distillation with 0.25" ProPak at 5 Torr to produce 810 g distilled FAME with AV of 0.55 and a residual lipid phase with total glyceride content of 80%. The distilled FAME is contacted with aqueous sodium hydroxide for 1 hour and centrifuged to remove sodium soaps. The treated FAME is dried at 150 C for 30 minutes at 50 Torr to yield a B100 FAME with AV of 0.09.

Example 7—Exemplary Methods Using Vapor Phase Methanol Injection to Reduce AV 500 g of the washed/decanted product mixture (AV 3.5) from Example 6 is added to a stirred autoclave with top & bottom ports and a back-pressure regulator set for 5 barg. The contents are heated to 250 C, then 75 g of methanol (reused from flash step in Example 6) is injected over a 1 hour period. The contents are then cooled and recovered from the autoclave and tested to reveal an AV of 1.2.

While the forgoing written description enables one of ordinary skill to make and use alternative embodiments including a best mode thereof, those of ordinary skill will understand and appreciate the existence of variations, combinations, and equivalents of the specific embodiments, methods, and examples herein. The invention should therefore not be limited by the above described exemplary embodiments, methods and examples, but by all embodiments and methods within the scope and spirit of the invention.

A number of exemplary embodiments have been described. Nevertheless, it will be understood that various modifications may be made without departing from the spirit and scope of the invention. Accordingly, other embodiments are within the scope of the following claims.

What is claimed is:

1. A method or an industrial process for producing a fatty acid alkyl ester from a natural oil feedstock and/or a mixed lipid feedstock, wherein the natural oil feedstock and/or mixed lipid feedstock comprises 0% to 100% un-esterified organic acid by weight of the feedstock, the method or industrial process comprising:

(a) producing a plurality of fatty acid alkyl esters using an alcoholysis reaction, wherein the alcoholysis reaction takes place under conditions comprising:

(i) feeding or adding the natural oil feedstock and/or mixed lipid feedstock having no catalyst and at least one alcohol into an alcoholysis reactor or equivalent, thus making a reaction mixture of the natural oil feedstock and/or mixed lipid feedstock into the alcoholysis reactor or equivalent;

(ii) reacting the reaction mixture at a temperature of between about 100° C. to 500° C. and pressure of between about 1 bar to about 355 bar, thereby producing the plurality of crude fatty acid alkyl esters, wherein optionally the plurality of crude fatty acid alkyl esters have an acid value of less than about 10;

(b) separating the crude fatty acid alkyl ester from at least one alcohol and/or water, either inside or outside the alcoholysis reactor, (c) purifying the crude fatty acid alkyl ester by a process comprising generating a first fatty acid alkyl ester and at least a first residual lipid phase; and (d) recycling of at least a portion of the first residual lipid phase back to the alcoholysis reactor or equivalent for alcoholysis so as to increase the overall yield of fatty acid alkyl ester.

2. The method or industrial process of claim 1, further comprising subjecting the product mixture of step (a) to at least one flash separation step, wherein the pressure of the alcoholysis reactor product mixture is reduced after passing through a back-pressure regulator, optionally reduced to about 0 to 20 barg, or about atmospheric pressure, and the decrease in pressure results in an environment in which the vapor pressure of the unreacted alcohol allows for its evaporation from the reaction product mixture, wherein optionally, the pressure reduction from reactor pressure to atmospheric pressure comprises use of 1, 2, 3 or more steps, and optionally, the one or more flash steps generate a flashed product mixture wherein between about 0.01% and 99.9%, or approximately 90%, 91%, 92%, 93%, 94%, 95%, 96%, 97% or 99% or more, of the unreacted alcohol and/or water in the product mixture are separated and/or recovered from the product mixture, and optionally, the flashed alcohol is between about 140° C. and 250° C., and optionally, at least a portion of the flashed alcohol can be utilized downstream for heat recovery and/or alcoholysis.

3. The method or industrial process of claim 1, further comprising an additional step of mixing the post-flashed reaction product mixture with water, optionally concurrently or counter-currently, and separating, optionally via gravitational means or a gravitational force, to form a mixture of an aqueous stream comprising a glycerol and/or alcohol, and a crude fatty acid alkyl ester stream comprising fatty acid alkyl esters and, optionally, non-fatty acid alkyl ester saponifiables and unsaponifiables, wherein optionally, the method or means of gravitational separation comprises decantation, centrifugation, hydrocycloning, or any combination thereof, and optionally, the weight percent of glycerin remaining in the post-washed/separated crude fatty acid alkyl ester stream ranges from between about 0 to about 1 wt. %, and optionally, the amount of water used to wash the glycerol from the fatty acid alkyl ester does not exceed about 10% to 30%, or about 20%, of the mass of the fatty acid alkyl ester stream.

4. The method or industrial process of claim 2, further comprising an additional step of concentrating and/or refining the glycerol from the aqueous stream, optionally in a stripping column or equivalent, thereby producing a glycerol product that contains less than 1 wt % salt content, wherein optionally, the concentrated glycerin is equal to splitter crude grade from thermal fat splitting, or a glycerol product that is about 70% to 90%, or about 80%, glycerol, or is USP-grade, or is substantially pure, wherein optionally substantially pure glycerol product has at least about 98% glycerol, or is at least about 99% glycerol, or the pure glycerol product has between about 95% to about 99.8% glycerol.

5. The method or industrial process of claim 1, further comprising a step of subjecting at least a portion of, or substantially all of, the crude fatty acid alkyl ester stream to a drying step, e.g., a forced circulation drying step, wherein substantially all of the water and/or alcohol in the crude fatty acid alkyl ester stream is removed, wherein optionally a portion of the crude fatty acid alkyl ester stream to a drying step at least 5%, 10%, 20%, 30% or 40% or more of, the crude fatty acid alkyl ester stream, wherein substantially all of the water and/or alcohol is about 90%, 95%, 98%, 99% or 99.5% or more of the water and/or alcohol, and optionally between about 95% and 99.9% or between about 98% and 100%, of the water and/or alcohol in the crude fatty acid alkyl ester stream is removed, and optionally, at least a portion of the crude fatty acid alkyl ester stream represents between about 0.01% to 80%, or between about 0.1% to 90%, and substantially all of the crude fatty acid alkyl ester stream represents between about 80% to 100%, and optionally, the forced recirculation evaporator is maintained at between about 150° C. to about 300° C. and from about 50 Torr absolute to about 10 barg, and optionally, the residence time of the crude fatty acid alkyl ester stream in the forced recirculation evaporator is between about 0.1 hours to about 8 hours, and optionally, at least a portion of the crude fatty acid alkyl ester stream being dried undergoes simultaneous alcoholysis by continuously injecting at least a portion of the hot flashed alcohol from claim 2 into the stream at one or multiple points in the forced recirculation evaporator and continuously removing alcohol with the water formed from esterification of free fatty acids, optionally, at least a portion of the crude fatty acid alkyl ester stream being dried undergoes simultaneous glycerolysis, either by utilizing only the remaining glycerin in the stream or by adding glycerin up to about 0.5 wt %, 1 wt % or 2 wt % or more of the stream, thereby producing a dried crude fatty acid alkyl ester stream with acid value of 4 or less and moisture content of less than 0.5 wt %.

6. The method or industrial process of claim 1, further comprising a step of subjecting the dried crude fatty acid alkyl ester stream to distillation to produce a first fatty acid alkyl ester and a first residual lipid phase, wherein optionally, the first fatty acid alkyl ester produced contains an acid value between 0 and 3, thereby producing a first fatty acid alkyl ester than can meet the B100 specification for biodiesel.

7. The method or industrial process of claim 1, further comprising a step of subjecting the first fatty acid alkyl ester to a chemical neutralization and separation step to reduce the acid value to meet the B100 specification for biodiesel if it does not already meet the B100 specification, wherein optionally, chemical neutralization is conducted with one or more hydroxides, carbonates, oxides, bicarbonates, amines, or any combination thereof, and optionally, chemical neutralization is aided by the addition of up to about 10%, or between about 5% and 15%, volume of water with respect to the fatty acid alkyl ester, and optionally, after the chemical neutralization step has been concluded, the neutralized mixture is subjected to a separation step that comprises centrifugation, decantation, filtration, or any combination thereof, thereby producing a neutralized fatty acid alkyl ester that can meet, or substantially meet, the B100 specification for biodiesel.

8. The method or industrial process of claim 1, further comprising a step of subjecting the neutralized fatty acid alkyl ester to a drying step to reduce the moisture content to meet the B100 specification for biodiesel if it does not already meet the B100 specification, wherein optionally, the starting moisture content is less than about 0.5 wt %, or is between about 0.1 wt % and 5.0 wt %, and optionally, the neutralized fatty acid alkyl ester is subjected to a washing or adsorption step to remove any residual metals content prior to drying, thereby producing a dried fatty acid alkyl ester that can meet, or substantially meet, the B100 specification for biodiesel.

9. The method or industrial process of claim 1, further comprising a step of subjecting the crude fatty acid alkyl ester of step (d) to a neutralization step that reduces the acid value by between about 0.01% to 100%, and results in a deacidified, or substantially deacidified, crude fatty acid alkyl ester, wherein optionally, the neutralization step produces solid fatty acid soaps, and optionally, if solid fatty acid soaps are produced, they are either allowed to remain with the deacidified, or substantially deacidified, crude fatty acid alkyl ester or they are removed, and optionally, if the solid fatty acid soaps are removed from the deacidified, or substantially deacidified, crude fatty acid alkyl ester, the solid fatty acid soaps contain entrained deacidified, or substantially deacidified, crude fatty acid alkyl ester, and optionally the solid fatty acid soaps entrained with deacidified, or substantially deacidified, crude fatty acid alkyl ester are washed with the same alcohol used in the alcoholysis reaction so as to recover substantially all of the deacidified, or substantially deacidified, crude fatty acid alkyl ester.

10. The method or industrial process of claim 1, further comprising a step of subjecting the crude fatty acid alkyl ester, the dried crude fatty acid, the deacidified crude fatty acid alkyl ester, or any combination thereof, to one or multiple separation steps, and optionally the at least one separation step comprises an evaporative step, and optionally the evaporative step comprises distillation, thereby creating a first fatty acid alkyl ester stream and a first residual lipid stream, wherein optionally, the crude fatty acid alkyl ester is dried and/or desolventized in the same process unit that also produces a first fatty acid alkyl ester and a first residual lipid stream, and optionally at least a portion of the crude fatty acid alkyl ester stream undergoes glycerolysis that reduces the acid value of the stream from about 0.01 to 100%, or 0.1 to 98%.

11. The method or industrial process of claim 1, further comprising a step comprising subjecting the first fatty acid alkyl ester and/or the first residual lipid stream to one or multiple upgrading steps so as to maximize the value of the streams created, wherein optionally, one or multiple upgrading steps comprise neutralization of fatty acid via base, filtration, liquid-liquid (liq-liq) extraction, chromatography, ion exchange, crystallization, glycerolysis, drying, and esterification, or equivalents, and optionally, any stream before and/or after an upgrading step is recycled back to the system so as to increase the yield of fatty acid alkyl esters.

12. The method or industrial process of claim 1, wherein the neutralization of fatty acid via base is conducted with an alkaline reagent comprising any oxide, hydroxide, carbonate, bicarbonate, ion exchange resin, or equivalents, or any combination thereof.

13. The method or industrial process of claim 1, wherein the neutralization of fatty acid via base produces a fatty acid soap that optionally is removed from the fatty acid alkyl ester by one or multiple methods comprising filtration, centrifugation, washing, adsorption, ion exchange, or equivalents, or any combination thereof.

14. The method or industrial process of claim 1, wherein the fatty acid soap removed from the fatty acid alkyl ester comprises sodium, potassium, calcium, magnesium, iron, aluminum, or any combination thereof, wherein optionally, the fatty acid soap removed from the fatty acid alkyl ester contains entrained fatty acid alkyl ester, and optionally, the entrained fatty acid alkyl ester is recovered by one or multiple steps comprising washing, evaporation, solid-liquid extraction, acidulation, or any combination thereof, or equivalents, and optionally a first fatty acid alkyl ester stream meets or substantially meets the B100 specification as a result of one or multiple separation steps conducted on the crude fatty acid alkyl ester, and optionally the first fatty acid alkyl ester stream does not meet the B100 specification as a result of one or multiple separation steps conducted on the crude fatty acid alkyl ester and thus requires one or multiple steps to produce a fatty acid alkyl ester stream that meets or substantially meets the B100 specification.

15. The method or industrial process of claim 1, wherein optionally the organic acid comprises a free fatty acid.

16. The method or industrial process of claim 1, wherein the natural oil and/or the mixed lipid feedstock comprises an acid oil, a fatty acid, a fatty acid distillate, a wax, a tank bottoms, a distillers corn oil, an algal oil, a fish oil, a coconut oil, a palm kernel oil, a yellow grease, a brown grease, a tallow, a linseed oil, a flaxseed oil, a cottonseed oil, a rapeseed (canola) oil, a peanut oil, a sunflower oil, a safflower oil, a coconut oil, a palm oil, dende oil, an oil from a plant of the genus *Elaeis* or *Attalea*, a soybean oil, a microbial oil, an insect oil, a fatty acid distillate, an acid oil, an algal oil, a microbial oil, a crude edible oil, or any combination thereof.

17. The method or industrial process of claim 1, wherein producing a biodiesel or a fat-based diesel fuel meeting or exceeding the specifications of ASTM Standard D6751-14 for B100 biodiesel.

18. The method or industrial process of claim 1, producing a USP grade glycerol and/or a splitter crude grade glycerol.

19. The method or industrial process of claim 1, wherein the alcoholysis reaction comprises a vapor phase reaction and/or a supercritical alcoholysis reaction and/or a liquid phase reaction.

20. The method or industrial process of claim 1, wherein the natural oil feedstock and/or mixed lipid feedstock comprises about 5% to 95% un-esterified organic acid by weight of the feedstock.

21. The method or industrial process of claim 1, comprising feeding or adding the natural oil feedstock and/or mixed lipid feedstock having no catalyst with a co-solvent into the alcoholysis reactor or equivalent.

22. The method or industrial process of claim 21, wherein the at least one alcohol and co-solvent are concurrently or counter-currently contacted with the lipid feedstock.

23. The method or industrial process of claim 1, wherein the at least one alcohol is concurrently or counter-currently contacted with the lipid feedstock.

24. The method or industrial process of claim 1, wherein the at least one alcohol comprises one, two or multiple alcohols.

25. The method or industrial process of claim 1, wherein the molar ratio of the at least one alcohol-to-feedstock in the reaction mixture is between about 1:1 to about 300:1.

26. The method or industrial process of claim 25, wherein the molar ratio of the at least one alcohol-to-feedstock in the reaction mixture is between about 1:1 to about 40:1.

27. The method or industrial process of claim 21, wherein the mass ratio of the optional co-solvent-to-feedstock in the reaction mixture is between about 0.001:1 to 0.01:1 and about 1:1 to 5:1.

28. The method or industrial process of claim 1, wherein water and/or the at least one alcohol is/are added during the formation of the fatty acid alkyl ester.

29. The method or industrial process of claim 1, wherein water and/or the at least one alcohol is/are removed during the formation of the fatty acid alkyl ester.

30. The method or industrial process of claim 1, wherein if glycerin is formed during the splitting of the feedstock with water, the method comprises removing all or substantially all of the glycerin from the crude fatty acid ester.

31. The method or industrial process of claim 1, comprising removing all or substantially all of the water and/or the at least one alcohol from the crude fatty acid ester.

32. The method or industrial process of claim 1, wherein the first residual lipid phase comprises one or multiple fractions that comprise saponifiable and/or unsaponifiable content.

33. The method or industrial process of claim 1, wherein at least a portion of the saponifiable content and/or unsaponifiable content is recycled back to the alcoholysis reactor or equivalent.

34. The method or industrial process of claim 1, wherein the saponifiable content and/or unsaponifiable content that is not recycled back to the alcoholysis reactor is thereby either purged from the system and/or is subjected to further downstream reaction and/or separation so as to valorize or recycle the components of that stream.

35. The method or industrial process of claim 34, wherein less than about 50% of saponifiable content and/or unsaponifiable content is subjected to further downstream reaction and/or separation.

36. The method or industrial process of claim 1, wherein the method or industrial process further comprises a thermal hydrolysis or a fat splitting of the natural oil or the mixed lipid feedstock before step (a).

* * * * *